(12) United States Patent
Ou et al.

(10) Patent No.: US 11,545,913 B2
(45) Date of Patent: Jan. 3, 2023

(54) HOPF OSCILLATOR BASED DEVICE COMPRISING INVERTERS

(71) Applicant: HUAWEI TECHNOLOGIES CO., LTD., Guangdong (CN)

(72) Inventors: Shousong Ou, Nuremberg (DE); Mingshen Li, Aalborg (DK); Josep Maria Guerrero, Aalborg (DK); Juan Carlos Vasquez, Aalborg (DK)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/513,376

(22) Filed: Oct. 28, 2021

(65) Prior Publication Data
US 2022/0052623 A1    Feb. 17, 2022

Related U.S. Application Data

(63) Continuation of application No. PCT/EP2019/075537, filed on Sep. 23, 2019.

(51) Int. Cl.
*H02M 7/5387* (2007.01)
*G05B 13/04* (2006.01)
*H02J 3/24* (2006.01)
*H02M 7/48* (2007.01)
*H02M 7/493* (2007.01)

(52) U.S. Cl.
CPC ...... *H02M 7/53871* (2013.01); *G05B 13/042* (2013.01); *H02J 3/24* (2013.01); *H02M 7/48* (2013.01); *H02M 7/493* (2013.01)

(58) Field of Classification Search
None
See application file for complete search history.

(56) References Cited

PUBLICATIONS

Nagliero, "Analysis of a universal inverter working in grid connected, stand-alone and micro-grid",2010, Industrial Electronics (ISIE), 2010 IEEE International Symposium, pp. 1-8 (Year: 2010).*
Riyadi, "Inverse Clarke Transformation based Control Method of a Three-Phase Inverter for PV-Grid Systems", 2014, ICITACEE, pp. 351-355 (Year: 2014).*

(Continued)

*Primary Examiner* — Mohammad Ali
*Assistant Examiner* — David Earl Ogg
(74) *Attorney, Agent, or Firm* — Womble Bond Dickinson (US) LLP

(57) ABSTRACT

The present disclosure relates to a device, comprising a first inverter, wherein the first inverter is configured to invert a DC input voltage into an AC output voltage, a first controller, wherein the first controller is configured to provide a reference voltage for the first inverter on the basis of an AC output current of the first inverter, a second inverter, wherein the second inverter is configured to invert a DC input voltage into an AC output voltage, a second controller, wherein the second controller is configured to provide a reference voltage for the second inverter on the basis of an AC output current of the second inverter, wherein the first inverter and the first controller form a first Hopf oscillator, wherein the second inverter and second controller form a second Hopf oscillator, and wherein the first Hopf oscillator is coupled to the second Hopf oscillator.

4 Claims, 20 Drawing Sheets

(56) References Cited

PUBLICATIONS

Tayab, "A Modified Droop Controller for Parallel Operation of Single-Phase Inverters in Islanded Microgrid", Jan. 2017, International Journal of Intelligent Engineering and Systems vol. 10 No.4, pp. 11-17 (Year: 2017).*

Antoine Rosse.,"Control of Parallel Inverters using Nonlinear Oscillators with VirtualOutput Impedance",2016 18th European Conference on Power Electronics and Applications (EPE 16 ECCE Europe). Jointly Owned by IEEE-PELS and EPE Association, Sep. 5, 2016,total 10 pages.

Brian B. Johnson et al.,"Oscillator-Based Inverter Control for Islanded Three-Phase Microgrids",IEEE Journal of Photovoltaics, vol. 4, No. 1, Jan. 2014,total 9 pages.

Lasseter, R.H., "MicroGrids," Power Engineering Society Winter Meeting, 2002. IEEE, vol. 1, No., pp. 305-308 vol. 1, 2002, total 4 pages.

Guerrero, J.M.; Chandorkar, M.; Lee, T.; Loh, P.C., "Advanced Control Architectures for Intelligent Microgrids Part I: Decentralized and Hierarchical Control," Industrial Electronics, IEEE Transactions on, vol. 60, No. 4, pp. 1254-1262, Apr. 2013, total 9 pages.

J. Guerrero, L. de Vicuna, J. Matas, M. Castilla, and J. Miret, A wireless controller to enhance dynamic performance of parallel inverters in distributed generation system, IEEE Trans. Power Electron., vol. 19, No. 5, pp. 1205 1213, Sep. 2004, total 9 pages.

C. Sao and P. Lehn, "Autonomous load sharing of voltage source converters," IEEE Trans. Power Del., vol. 20, No. 2, pp. 1009 1016, Apr. 2005, total 8 pages.

Yajuan Guan, Weiyang Wu, Xiaoqiang Guo, Herong Gu. "An Improved Droop Controller for Grid-Connected Voltage Source Inverter in Microgrid." 2nd International Symposium on Power Electronics for Distributed Generation Systems, PEDG 2010, 2010: 823-828, total 6 pages.

S. J. Chiang, C. Y. Yen, and K. T. Chang, A multimodule parallelable series-connected PWM voltage regulator, IEEE Trans. Ind. Electron., vol. 48, No. 3, p. 506 516, Jun. 2001, total 11 pages.

Engler, A.; Soultanis, N., "Droop control in LV-grids," Future Power Systems, 2005 International Conference on, vol., No., pp. 6 pp. 6, Nov. 18-18, 2005, total 6 pges.

Guerrero, J.M.; Matas, J.; Luis Garcia de Vicuna; Castilla, M.; Miret, J., "Decentralized Control for Parallel Operation of Distributed Generation Inverters Using Resistive Output Impedance," Industrial Electionics, IEEE Transactions on, vol. 54, No. 2, pp. 994-1004, April Apr. 2007, total 11 pages.

Karel De Brabandere, Bruno Bolsens, Jeroen Van den Keybus, et al, A Voltage and Frequency Droop Control Method for Parallel Inverters, IEEE Trans. Power Electronics, vol. 22, No. 4, pp. 1107-1115, Jul. 2007, total 11 pages.

Vandoorn, T.L.; Meersman, B.; Degroote, L.; Renders, B.; Vandevelde, L., "A Control Strategy for Islanded Microgrids With DC-Link Voltage Control," Power Delivery, IEEE Transactions on, vol. 26, No. 2, pp. 703-713, April Apr. 2011, total 11 pages.

N. Pogaku, M. Prodanovic, and T. C. Green, Modeling, analysis and testing of autonomous operation of an inverter-based microgrid, IEEE Trans. Power Electron., vol. 22, No. 2, pp. 613 625, Mar. 2007, total 13 pages.

Alireza Kahrobaeian, Yasser Abdel-Rady I. Mohamed, Analysis and Mitigation of Low-Frequency Instabilities in Autonomous Medium-Voltage Converter-Based Microgrids With Dynamic Loads, IEEE Trans. Industrial Electronics, vol. 61, No. 4, pp. 1643-1658 , Apr. 2014, total 16 pages.

Coelho, E.A.A.; Cortizo, P.C.; Garcia, P.F.D., "Small-signal stability for parallel-connected inverters in stand-alone AC supply systems," Industry Applications, IEEE Transactions on, vol. 38, No. 2, pp. 533-542, Mar./Apr. 2002, total 10 pages.

Vasquez, J.C.; Guerrero, J.M.; Savaghebi, M.; Eloy-Garcia, J.; Teodorescu, R., "Modeling, Analysis, and Design of Stationary-Reference-Frame Droop-Controlled Parallel Three-Phase Voltage Source Inverters," Industrial Electronics, IEEE Transactions on, vol. 60, No. 4, pp. 1271-1280, April Apr. 2013, total 10 pages.

Yajuan Guan; Vasquez, J.C.; Guerrero, J.M., "A simple autonomous current-sharing control strategy for fast dynamic response of parallel inverters in islanded microgrids," Energy Conference (ENERGYCON), 2014 IEEE International, vol., No., pp. 182,188, May 13-16, 2014, total 7 pages.

Johnson, Brian B., et al. "Synchronization of parallel single-phase inverters with virtual oscillator control." IEEE Transactions on Power Electronics, vol. 29, No. 11, pp. 6124-6138, 2014, total 15 pages.

Johnson, Brian B., et al. "Synthesizing Virtual Oscillators to Control Islanded Inverters." IEEE Transactions on Power Electronics, vol. 31, No. 8, pp. 6002-6015, 2016, total 14 pages.

Johnson, Brian B., et al. "Synchronization of nonlinear oscillators in an LTI electrical power network." IEEE Transactions on Circuits and Systems, vol. 61, No. 3, pp. 834-844, 2014, total 11 pages.

Sinha, Mohit, et al. "Virtual oscillator control subsumes droop control." American Control Conference (ACC), pp. 2353-2358, 2015, total 6 pages.

Oviedo, Erick, Nimrod Vazquez, and Ricardo Femat. "Synchronization Technique of Grid-Connected Power Converters Based on a Limit Cycle Oscillator." IEEE Transactions on Industrial Electronics, vol. 65, No. 1, pp. 709-717, May 2017, total 9 pages.

J. J. Sun et al.,"Hopf Bifurcation in Single-Phase Inverter Connected to Inductive Load",2016 IEEE 8th International Power Electronics and Motion Control Conference (IPEMC-ECCE Asia), Total 5 Pages.

* cited by examiner

HOPF OSCILLATOR BASED DEVICE COMPRISING INVERTERS

CROSS-REFERENCE TO RELATED APPLICATIONS

This application is a continuation of International Application No. PCT/EP2019/075537, filed on Sep. 23, 2019. The disclosure of the aforementioned application is hereby incorporated by reference in its entirety.

TECHNICAL FIELD

The present disclosure relates to a device, in particular to a device comprising at least two inverters. The inverters are respectively included in multiple coupled Hopf oscillators. The disclosure also relates to a microgrid comprising the device.

BACKGROUND

Traditionally, distribution power systems are configured in radial structures. Power and short-circuit currents flow unidirectional from distribution substations. Most protection, monitoring, and control devices are designed based on this configuration.

Recently, distributed generation has begun to emerge in the energy market, because of its value, for example, for peak shaving, combined heat and power, renewable portfolios, and transmission and distribution infrastructure deferral.

In some embodiments, a microgrid is an integrated energy system consisting of distributed energy resources and interconnected loads, which can operate in parallel with the grid-connecting or in an intentional island mode. Smart microgrids can generate, distribute, and regulate the flow of electricity to consumers.

In microgrids, the droop control method has dominated the autonomous control of parallel inverters in the last decade. Although this technique only needs local information to operate, it presents a number of problems that are solved along the literature.

The first one is that the droop coefficients that regulate frequency and amplitudes are basically proportional terms, so that in order to increase their range of values, derivative terms can be added.

The second one is that frequency and voltage are respectively related to active and reactive power when the output impedance of the generator is mainly inductive, however, in an inverter, the output impedance can be fixed by means of virtual impedance.

The third one is that in case of resistive lines/virtual impedances, active power is controlled by the inverter voltage amplitude, while the reactive power flow is dominated by the angle.

Based on these three improvements, a control architecture based on a virtual resistance, P-V and Q-f droops can be used to deal with the autonomous control of parallel connected inverters. The stability of autonomous microgrids is a critical issue considering the low inertia nature of such inverter dominated systems. Small signal based stability analysis has been reported in the prior art in order to study the stability of the autonomous droop-controlled microgrid system.

However, power droop control has the inherent drawback that it needs to calculate instantaneous active and reactive powers and then average through low pass filters, whose bandwidth may impact the transient response of the system. The authors in Yajuan et al. "*A simple autonomous current-sharing control strategy for fast dynamic response of parallel inverters in islanded microgrids*", Energy Conference (ENERGYCON), 2014 IEEE International, vol., no., pp. 182-188, 13-16 May 2014, try to increase the response of the system by using a virtual resistance. However, this method cannot deal independently with active and reactive power sharing.

The virtual oscillator control (VOC) is a time-domain controller, which allows digitally controlled inverters to emulate the dynamics of an oscillator. The method has been proven to be robust in front of load variations and can be used for a number of parallel-inverters inverters, requiring no communications, and presenting global asymptotic synchronization. The VOC in his original version has been extensively analyzed and implemented for islanded systems. In Johnson et al. "*Synchronization of parallel single-phase inverters with virtual oscillator control*", IEEE Transactions on Power Electronics, vol. 29, no. 11, pp. 6124-6138, 2014, a synchronization method based on limit cycle oscillator is proposed, and it offers inti-interference and fast response performance under grid voltage variations. However, the frequency-locked loop with extra reference.

Moreover, nonlinear oscillators have been widely used to model various physical or engineering processes, and they have shown the importance in modelling and control. Oscillator models are interesting owing to their synchronization characteristics, either with other oscillators or with external driving signals. In most cases, it is difficult task to choose the right parameters of the oscillators to ensure that they will synchronize as desired. The reason is that oscillators lack plasticity, they have fixed intrinsic frequencies and cannot dynamically adapt their parameters.

Virtual oscillator control is a new and promising technique for MG, which provides a way to synchronize and control interfaced inverters without the need of communication, by mimicking the characteristics of nonlinear oscillators.

However, a problem is the parallel operation of DC-AC (direct current-alternating current) inverters for microgrid applications. Thus, there is a need for an improved device comprising inverters.

SUMMARY

In view of the above-mentioned problems and disadvantages, embodiments of the present disclosure aim to improve the conventional devices comprising inverters. An object is thereby to provide a device allowing parallel operation of DC-AC inverters for a microgrid. The device should have a fast transient response. Further, it should be less sensitive to control parameters, and should enable a simple controller design. The device should provide robust performance even under load changes. A fast adjustment of active/reactive power rating should also be possible.

The object is achieved by the embodiments provided in the enclosed independent claims. Advantageous implementations of the embodiments are further defined in the dependent claims.

In some embodiments (sometimes referred to as, "a first aspect"), the disclosure relates to device, comprising a first inverter, wherein the first inverter is configured to invert a DC input voltage into an AC output voltage, a first controller, wherein the first controller is configured to provide (e.g., transmit, deliver, send) a reference voltage for the first inverter on the basis of an AC output current of the first inverter, a second inverter, wherein the second inverter is configured to invert a DC input voltage into an AC output voltage, a second controller, wherein the second controller is configured to provide a reference voltage for the second inverter on the basis of an AC output current of the second inverter, wherein the first inverter and the first controller form a first Hopf oscillator, wherein the second inverter and second controller form a second Hopf oscillator, and wherein the first Hopf oscillator is coupled to the second Hopf oscillator. In some embodiments, a Hopf oscillator is a nonlinear oscillator.

In some embodiments, the device may be related to parallel inverters, which means that the inverters (number≥2) connect to a common load in parallel. Each inverter may be configured to invert a DC input voltage into an AC output voltage. The controller of each inverter may be the same, and/or it may be configured to provide a voltage reference for a corresponding inverter on the basis of an AC output current of the corresponding inverter.

This allows the interconnection of a number of renewable generators and energy storage system at the same distribution grid, providing the following advantages: fast active and reactive current sharing among parallel connected inverters, novel application with Hopf oscillator synchronization, simple controller design, fast adjustment of active/reactive power rating, robust performance with loads changes, plug and play functionalities. Thus, and improved device is provided.

Moreover, the disclosure solves the following major problems, slow transient response, coupling active/reactive power, sensitive control parameters, slow changes need when adjusting active/reactive power rating and poor performances with different loads.

Furthermore, embodiments of the disclosure relate to the parallel operation of DC-AC inverters in a microgrid. The inverters utilize local measurement signal to realize paralleling, without any communication to exchange information between each other.

Synchronization of coupled oscillation is a natural property which can be utilized in many areas, such as neural processes, coherency in plasma physics, communications, and electric power systems. In some embodiments, the oscillator based paralleling is a fast and simple control method, which can offer a way to integrate renewable resources on the community level and allow for customer participation in the electricity enterprise.

In some embodiments, the first controller and the second controller are identical.

In some embodiments, the first inverter and/or the second inverter is a three-phase inverter. In some embodiments, at least one of the first inverter or the second inverter comprises a plurality (e.g., three) of half-bridges or a plurality (e.g., three) filters. In some embodiments, each of the plurality of filters may be an L filter (e.g., one inductor), an LCL filter (e.g., two inductors coupled to one capacitor), or an LC filter (e.g., one inductor coupled to one capacitor).

In some embodiments, each inverter has a three-phase configuration. In some embodiments, a three-phase configuration comprises at least one of the three half-bridges or the three filters.

In some embodiments, the first controller and/or the second controller is an oscillator controller.

In some embodiments, each controller is mainly an oscillator controller.

In some embodiments, the first inverter and the second inverter are not in mutual communication.

In some embodiments, none of the inverters of the device are in mutual communication.

In some embodiments, the first controller is configured to detect the output current of the first inverter and/or the second controller is configured to detect the output current of the second inverter.

In some embodiments, the controller of each inverter is configured to detect the output current of the local inverter.

In some embodiments, the device is configured to perform (e.g., execute, implement) a Clark transformation on the output current of the first inverter and/or second inverter, before the output current is detected by the first controller and/or second controller, respectively.

In some embodiments, the device is configured to perform a Clark transformation on the output current of each single inverter.

In some embodiments, the first controller and the second controller are configured to generate the reference voltage according to:

$$\begin{cases} \dot{V}_\alpha = (r^2 - (V_\alpha^2 + V_\beta^2))V_\alpha - \omega V_\beta - ki_\alpha \\ \dot{V}_\beta = (r^2 - (V_\alpha^2 + V_\beta^2))V_\beta + \omega V_\alpha + ki_\beta \end{cases},$$

wherein $i_{\alpha\beta}$ is the output current of the each inverter, after Clarke transformation, $V_{\alpha\beta}$ is the controller output reference voltage, r is a steady state amplitude of oscillation of the each Hopf oscillator, $\omega$ is the each Hopf oscillator's frequency, respectively, and k is a current gain.

In some embodiments, the device may be configured to perform the following operations in order to calculate a value of k:
1) run a model for k without load;
2) calculate a voltage Vpk;
3) if Vpk<Vmin, wherein Vmin corresponds to a voltage of the first inverter without rated load, then decrease k and go to operation 1);
4) if Vpk>Vmax, wherein Vmax corresponds to a voltage of the first inverter with full-rated load, then increase k and go to operation 1); and
5) if Vmin<Vpk<Vmax, then stop.

In some embodiments, the device may be configured to perform an inverse Clark transformation on the reference voltages.

In some embodiments, the device may include a pulse-width-modulation, PWM, unit and wherein the output reference voltage is provided as input to the PWM unit after the inverse Clark transformation.

In some embodiments (sometimes referred to as a "second aspect"), the disclosure relates to a microgrid comprising the device of one or more of the embodiments disclosed herein.

It has to be noted that all devices, elements, units and means described in the present application could be implemented in the software or hardware elements or any kind of combination thereof. All operations or steps which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF DRAWINGS

The above described embodiments and implementation forms of the present disclosure will be explained in the following description of specific embodiments in relation to the enclosed drawings, in which.

DETAILED DESCRIPTION OF EMBODIMENTS

Figure 1:
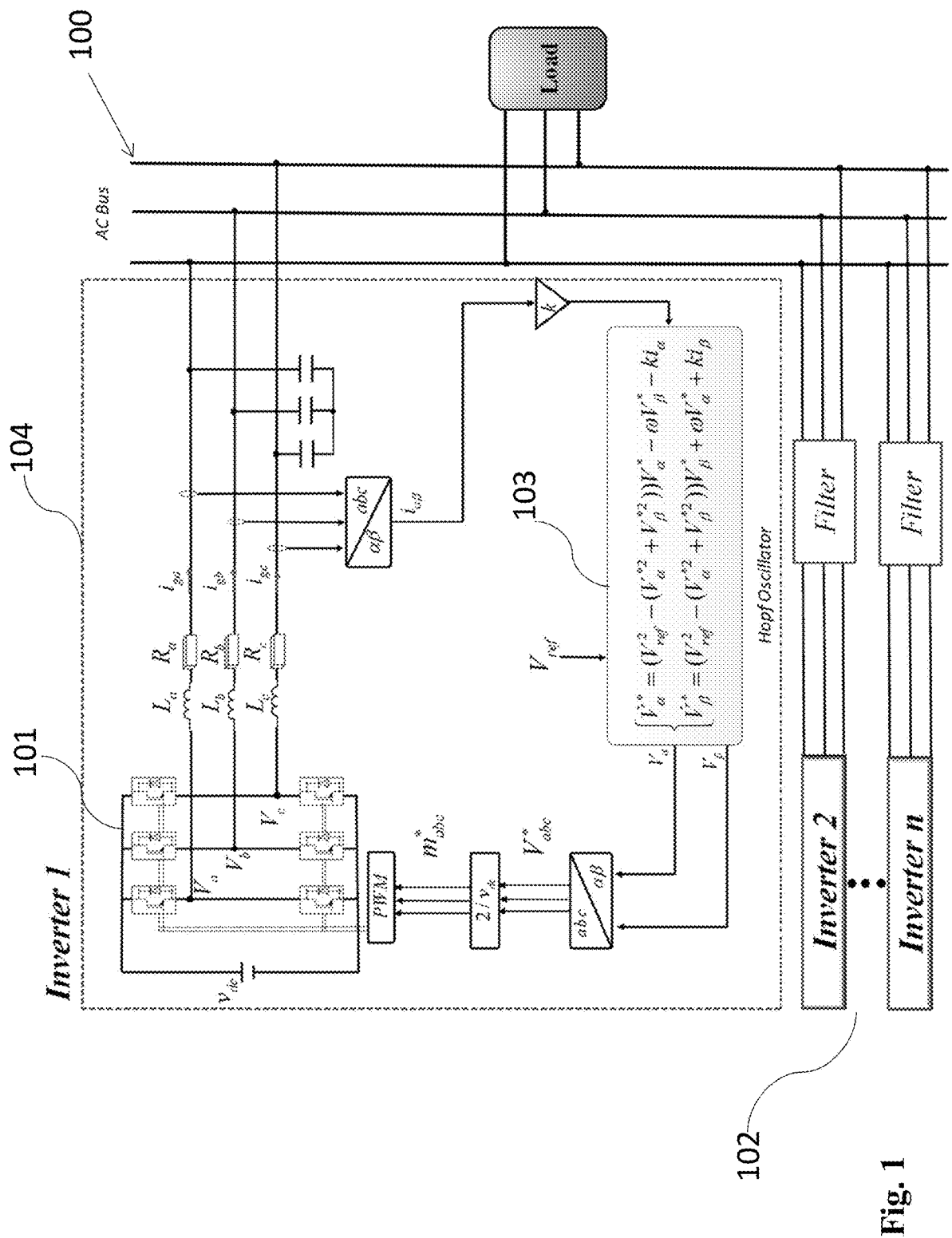
FIG. 1 shows a schematic representation of a device comprising a first and a second inverter, according to an embodiment.

FIG. 1 shows a schematic representation of a device 100 according to an embodiment, the device 100 comprising a first inverter 101 and a second inverter 102.

The first inverter 101 is configured to invert a DC input voltage into an AC output voltage. Moreover, the device 100 comprises a first controller 103, wherein the first controller 103 is configured to provide a reference voltage for the first inverter 101 on the basis of an AC output current of the first inverter 101.

The second inverter 102 is configured to invert a DC input voltage into an AC output voltage. Moreover, the device 100 comprises a second controller (not shown in the figure), wherein the second controller is configured to provide a reference voltage for the second inverter 102 on the basis of an AC output current of the second inverter 102.

The first inverter 101 and the first controller 103 form a first Hopf oscillator, and the second inverter 102 and second controller form a second Hopf oscillator, and the first Hopf oscillator is coupled to the second Hopf oscillator.

The device 100 can be comprised in a microgrid. The synchronization and current/power sharing process are essential for the operation of microgrid in islanded mode. Collections of oscillators are observed to synchronize in a diverse variety of systems, despite the inevitable differences between the oscillators. Therefore, the coupled Hopf oscillator concept can be applied in a microgrid to achieve paralleling operation.

In the following, for the sake of completeness, a summary of the theoretical background about Hopf oscillators is given.

The dynamics of a Hopf oscillator can be described by the following equations:

$$\begin{cases} \dot{x} = (r^2 - (x^2 + y^2))x - \omega y \\ \dot{y} = (r^2 - (x^2 + y^2))y + \omega x \end{cases} \quad (1)$$

wherein x, y are the states of the oscillator, ω refers to the oscillator frequency, and r is an amplitude parameter, which determines the steady state amplitude of oscillation ($x_\infty^2 + y_\infty^2 = r^2$).

Figure 2:
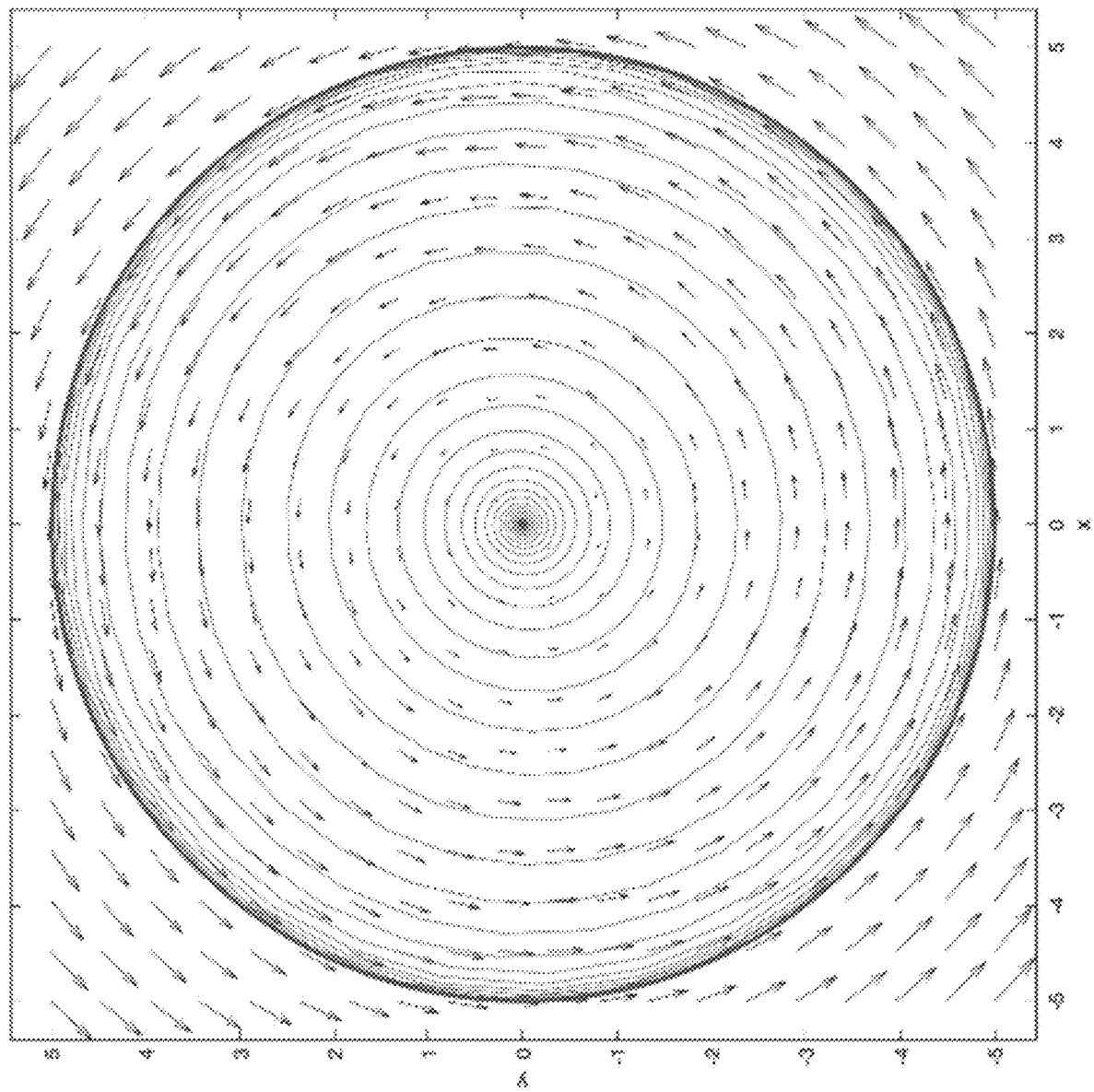
FIG. 2 shows a direction field of a Hopf oscillator of a device according to an embodiment.

FIG. 2 shows that the directions of the vector field of the Hopf oscillator and oscillator states are able to stabilize in a limit-cycle with desired frequency and phase (the initial state is (0, 0)). Therefore, the solutions of the system are x=r sin(ωt+θ$_0$), y=r cos(ωt+θ$_0$), where θ$_0$ is the initial phase of the state.

Figure 3:
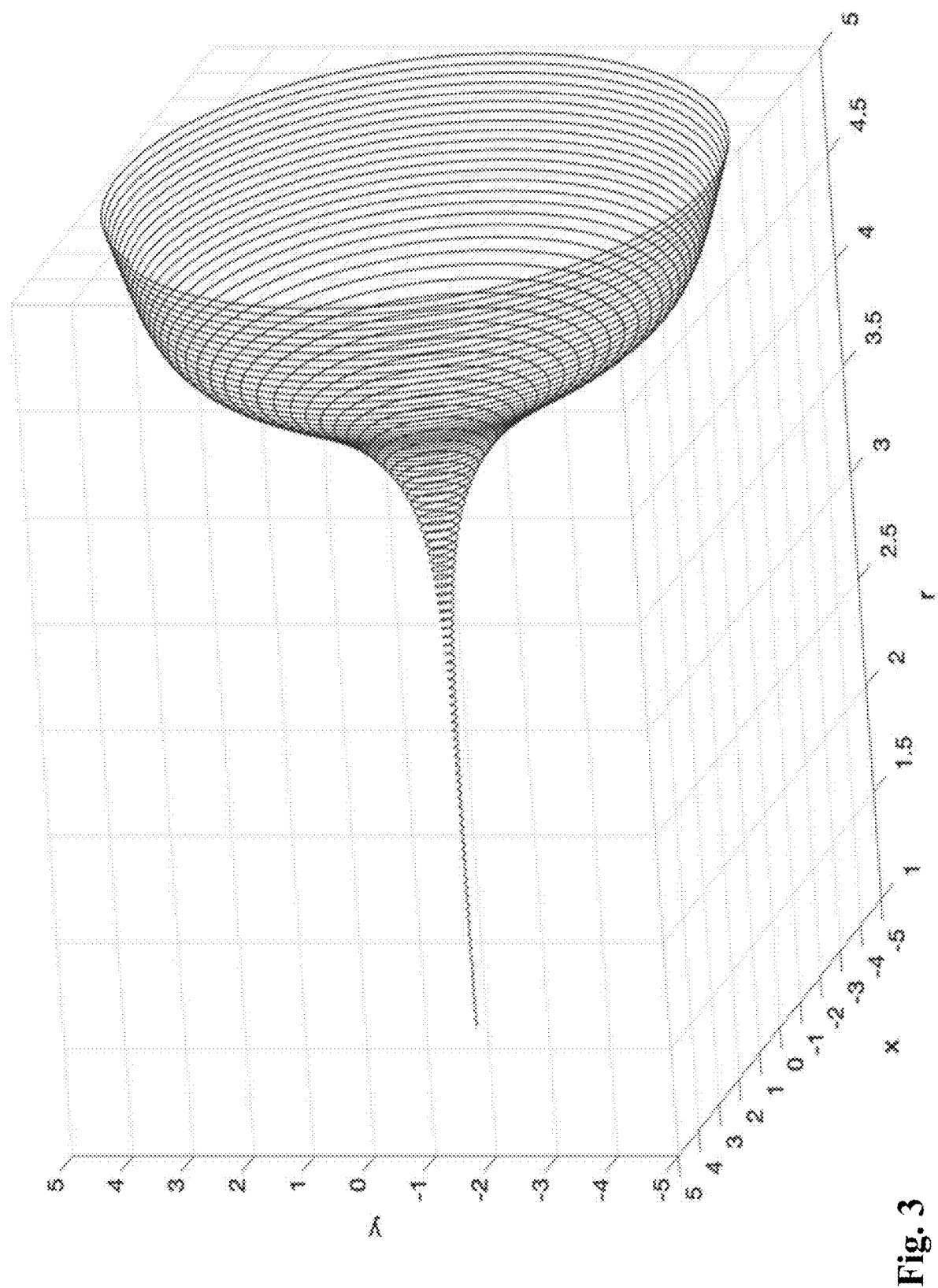
FIG. 3 shows a 3-D plot of a steady state amplitude of oscillation of a Hopf oscillator of a device according to an embodiment.

From FIG. 2, a limit cycle can be seen which is a closed orbit in the phase spate, that is, a non-constant trajectory, but returning to its starting point. $r^2$ will maintain the oscillations in the system. When r has a ramping change, the 3-D plot are shown in FIG. 3. It can be seen that the system follows r rapidly. It implies that the Hopf oscillator has a robust performance under different reference.

The control structure of a Hopf oscillator control for parallel three-phase LC-filter inverter is depicted in FIG. 1. The controller 103 is shaped with the i$_{\alpha\beta}$ current as follow:

$$\begin{cases} \dot{V}_\alpha = (r^2 - (V_\alpha^2 + V_\beta^2))V_\alpha - \omega V_\beta - ki_\alpha \\ \dot{V}_\beta = (r^2 - (V_\alpha^2 + V_\beta^2))V_\beta + \omega V_\alpha + ki_\beta \end{cases} \quad (2)$$

where i$_{\alpha\beta}$ is the output current of the inverter after Clarke transformation, V$_{\alpha\beta}$ is the controller output, which is utilized to generate the reference voltage with the inverse Clarke transform.

In the single-loop of Hopf oscillator, with regarding of the external periodic perturbation $i_{\alpha\beta}$, the oscillator phase dynamics are presented by the following differential equations:

$$\begin{cases} \dot{V} = (r^2 - V^2)V + k(i_\beta \sin(\theta) + i_\alpha \cos(\theta)) \\ \dot{\theta} = \omega + \frac{k}{V}(i_\alpha \sin(\theta) - i_\beta \cos(\theta)) \end{cases} \quad (3)$$

wherein V is the amplitude of output, k is the current gains, θ is the instantaneous phase angle of inverter output. The values of the parameters are tuned to depend on the power ratings and/or dynamical speed. Then, the voltage references under αβ axis are generated, which will divided by DC voltage. Finally, after αβ–abc transformation, a conventional sine-triangle PWM scheme is used to generate a switching signal.

Figure 4:
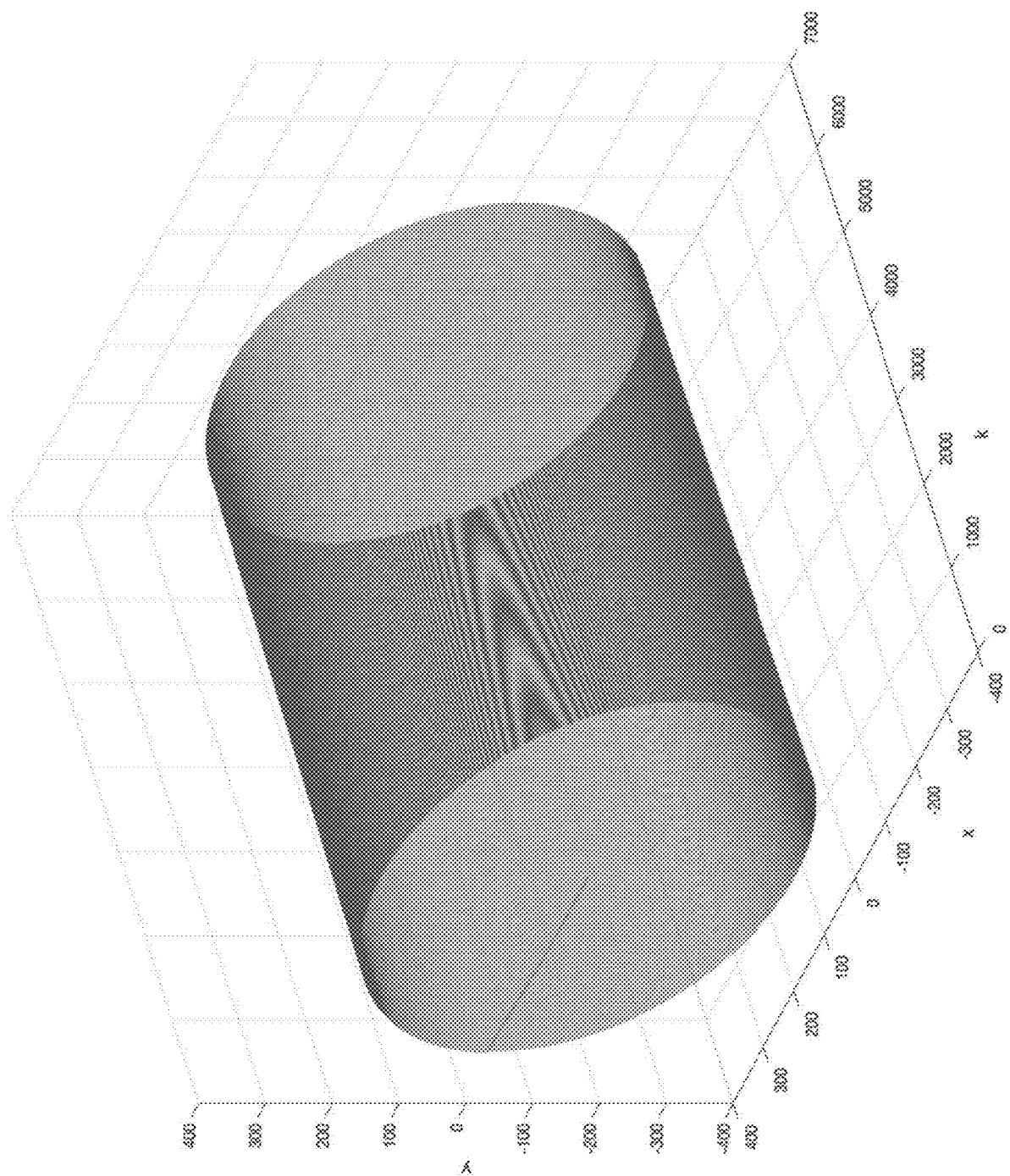
FIG. 4 shows a 3-D plot of a Hopf oscillator of a device according to an embodiment.

FIG. 4 shows a 3-D plot of a current gain of a Hopf oscillator of a device 100 according to an embodiment.

The current gain k is an important parameter which will affect the performance of system or device 100. FIG. 4 illustrates the phase orbit under different k.

From FIG. 4, it can be seen that if k changes ramping up from 0 to 7000, the output amplitude of voltage will not change. If k is overlarge, the voltage and current has a linear droop relationship. Therefore, k is designed to have small values to make the voltage follow the references.

Figure 5:
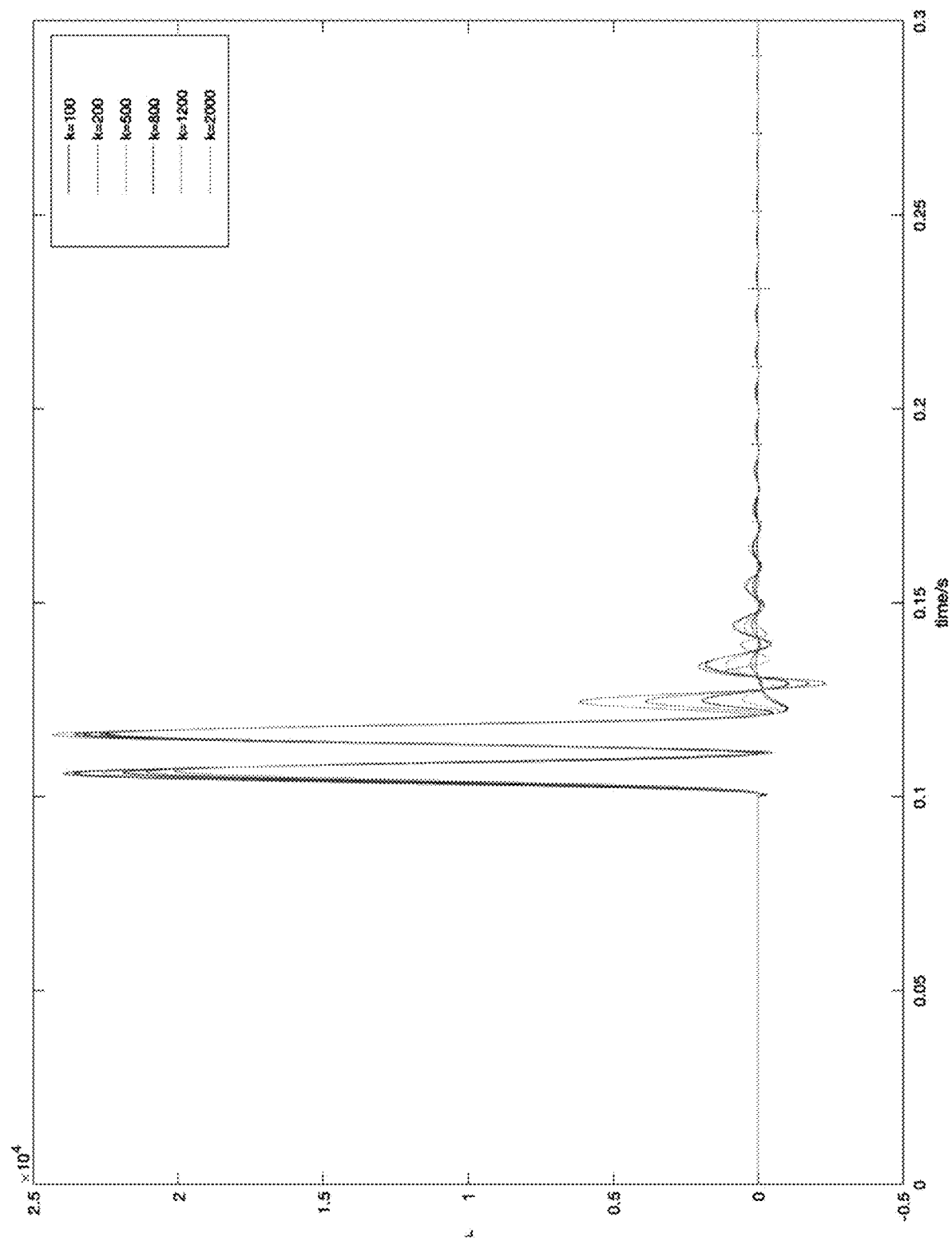
FIG. 5 shows a dynamic response of a power of an inverter of a device according to an embodiment.

FIG. 5 shows a dynamic response of the power of the inverter 101 of the device 100 according to an embodiment. In some embodiments, FIG. 5 illustrates the dynamics response of the system or device 100 under different k.

As it can be seen, if k is smaller, then the system is faster. If k is less than 100, the overshoot of transfer dynamics is higher which will make the system unstable. In an embodiment, k=100.

Therefore, in order to standardize the design, k can be chosen such that, when oscillator output current is 1 A, the inverter 101 is loaded to full rated capacity $\overline{P}_{rated}$. The values of k that ensure this are:

$$k = \frac{V_{min}}{\overline{P}_{rated}} \quad (4)$$

A system of inverters 101, 102 with different power ratings connected in parallel shares the load power in proportion to the ratings, if the current gains are chosen as suggested by equation (4). This directly follows as a consequence of real-root of output voltage. $k\overline{P}_{rated}$ can be set to be constant to make sure the system operation in rated power.

Figure 6:
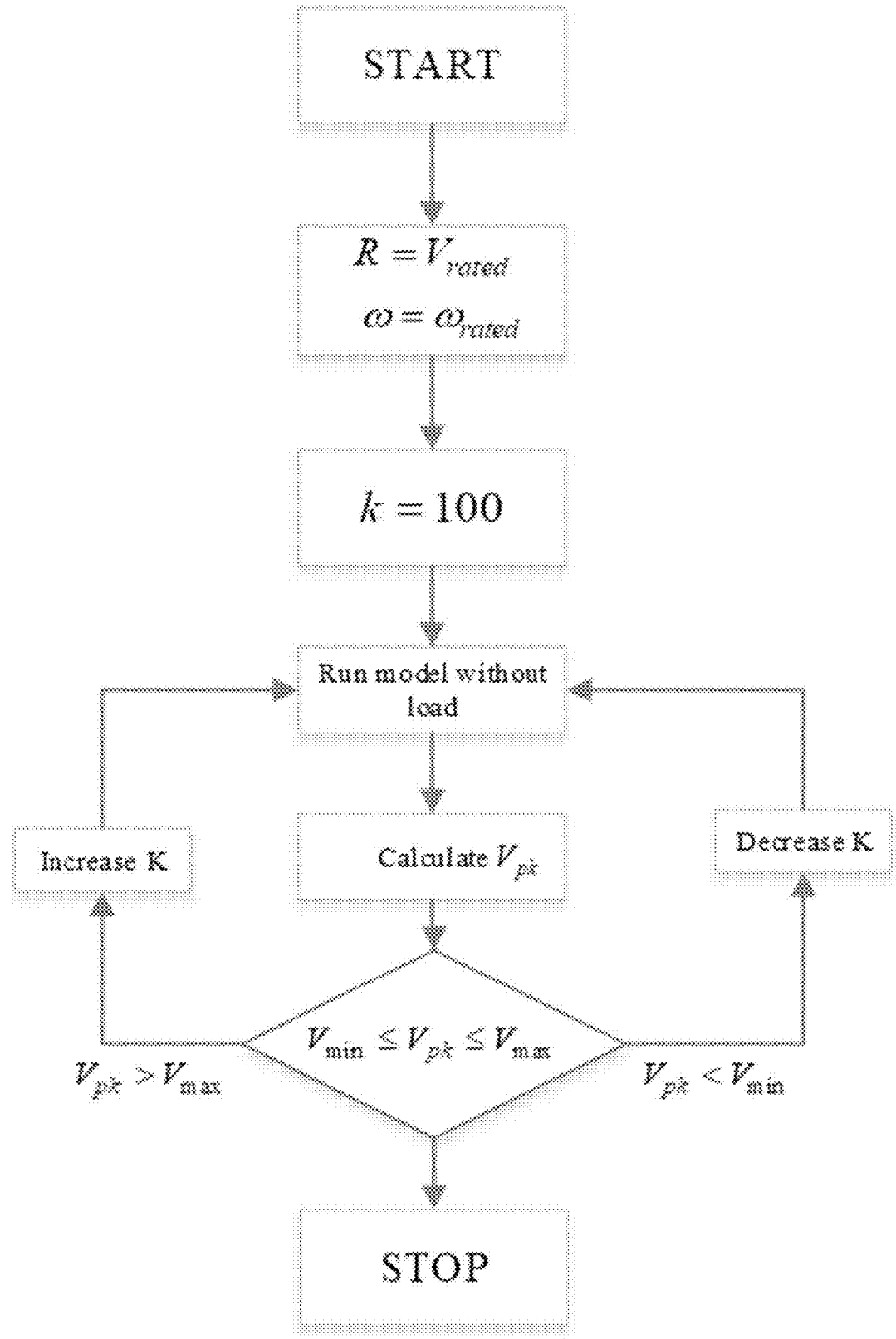
FIG. 6 shows a diagram of a process for computing a control parameter of a device according to an embodiment.

FIG. 6 shows a flow diagram of a process for computing the control parameter of the device 100 according to an embodiment.

The iterative design process is shown in FIG. 6. The Hopf oscillator has a stable oscillation at the rated system frequency at initial state. The maximum and minimum load voltages correspond to the no load and full-rated load cases, respectively. Consequently, the $V_{min} \leq V_{pk} \leq V_{max}$ will be satisfied across the entire rated load range.

In some embodiments, the device 100 can be configured to perform the following operations in order to calculate a value of k:
1) run a model for k without load;
2) calculate a voltage Vpk;
3) if Vpk<Vmin, wherein Vmin corresponds to a voltage of the first inverter 101 without rated load, then decrease k and go to operation 1);
4) if Vpk>Vmax, wherein Vmax corresponds to a voltage of the first inverter 101 with full-rated load, then increase k and go to operation 1); and
5) if Vmin<Vpk<Vmax, then stop.

Figure 7:
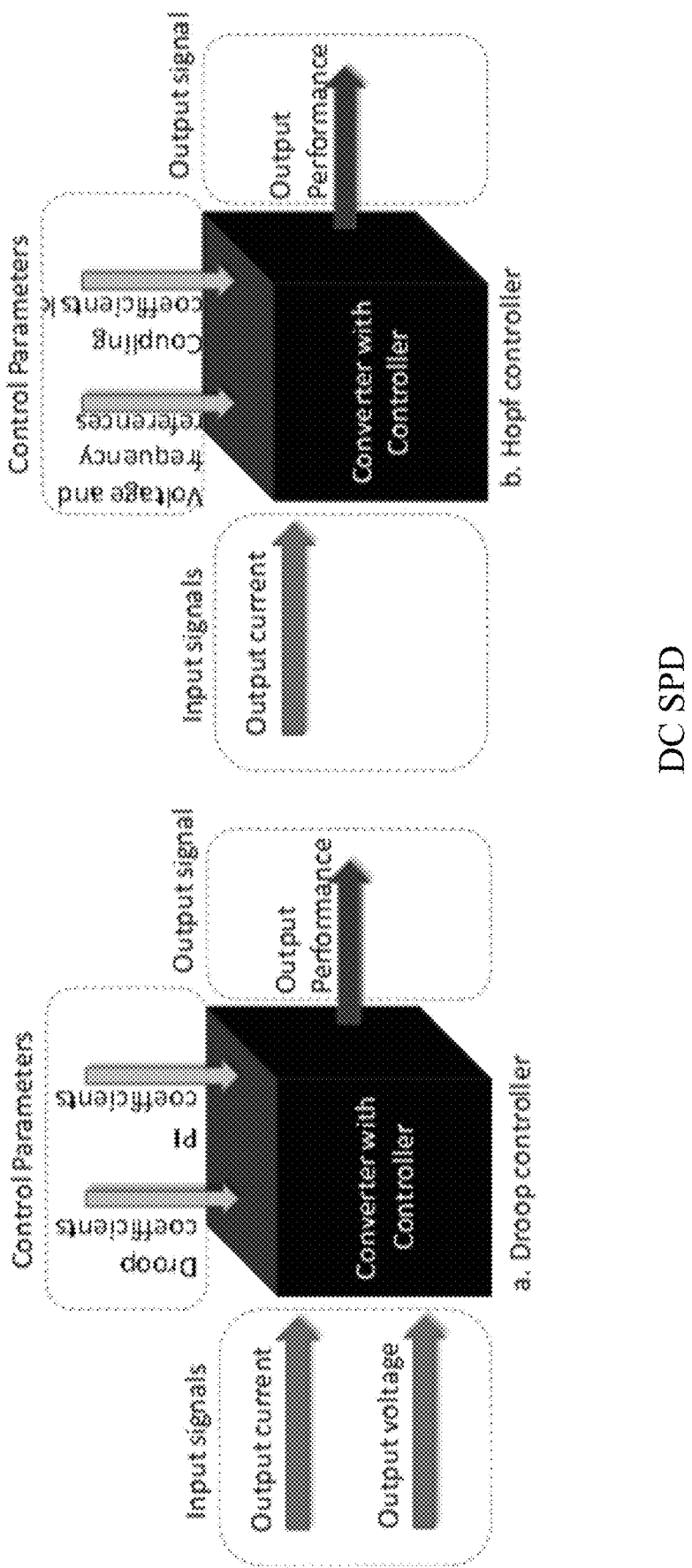
FIG. 7 shows a schematic diagram of a droop controller and of a Hopf controller according to an embodiment.

FIG. 7 shows a schematic diagram of a droop controller and of a Hopf controller according to an embodiment.

Droop control methods have been widely used as distributed control of parallel converters, and aims to proportionally share active and reactive powers with adjusting frequency and output voltage amplitudes of each converter locally in order to emulate the behavior of a synchronous generator. In order to apply droop to some certain conditions, it can be extended or add to some loops such as: adaptive voltage droop, synchronized reactive compensation, Q-V Dot droop and virtual impedance loop etc. The conventional droop controller consists of three control loops droop loop, voltage controller, and current controller.

Figure 8:
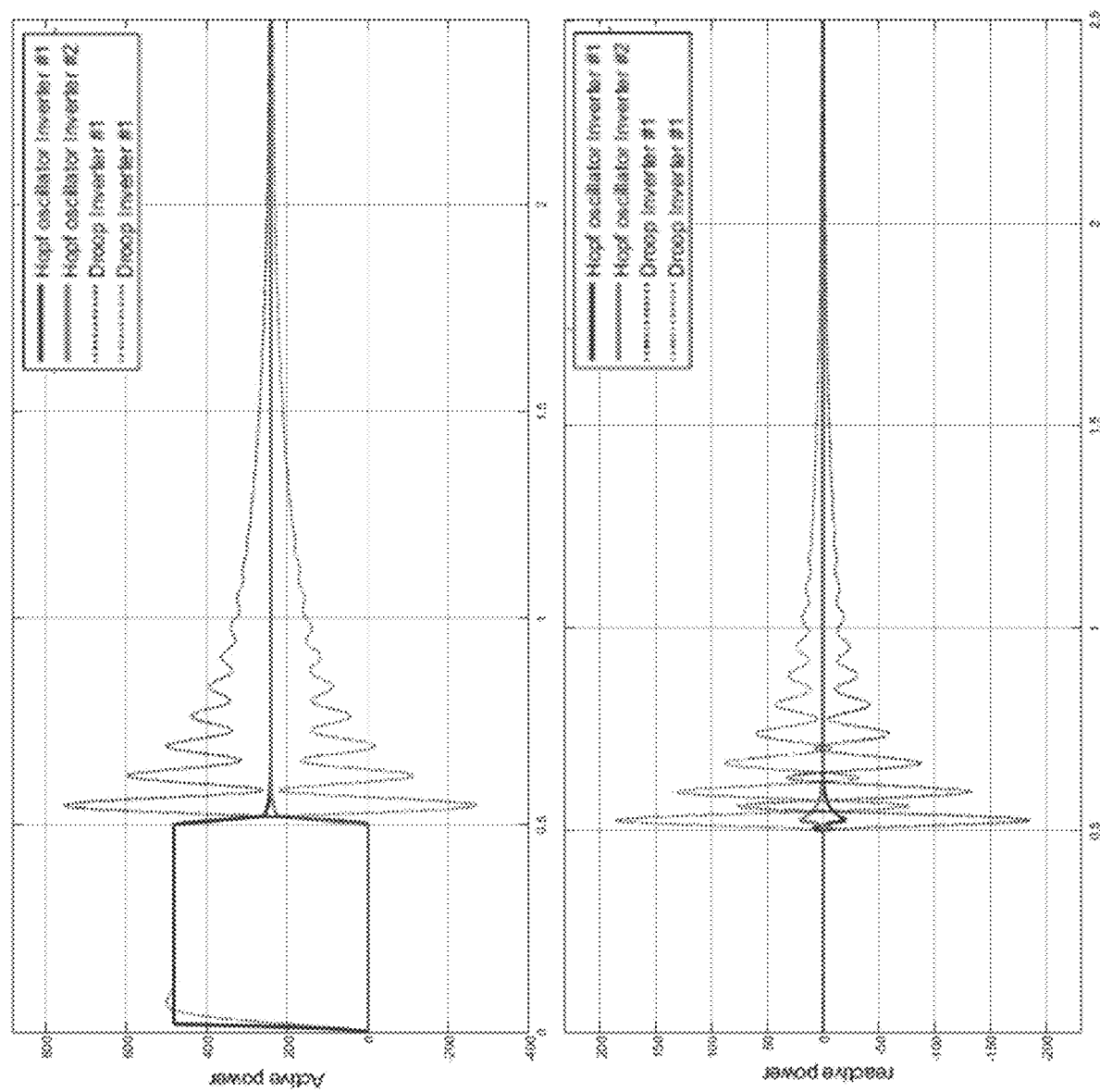
FIG. 8 shows a schematic diagram of a power response of a droop controller and of a Hopf controller according to an embodiment.

From FIG. 7, it can be seen that the Hopf controller 103 only needs output current on the input signal side. Regarding the output signal side, the active and reactive power sharing performances of two inverters 101 and 102 are shown in FIG. 8.

In contrast, Hopf oscillator acts on instantaneous measurements and inherently provides a faster and better damped response. Moreover, the coupled Hopf oscillator can regulate frequency adaptively which is unrealizable for droop method, and more complex secondary control is unnecessary for Hopf method. Note that the faster performance is because that the Hopf does not apply low-pass filter and double loops.

In some embodiments, for any improvement and extension methods from droop, the power calculation is needed, which is able to distinguish the droop and Hopf. In some embodiments, the response speed also can verify this.

Figure 9:
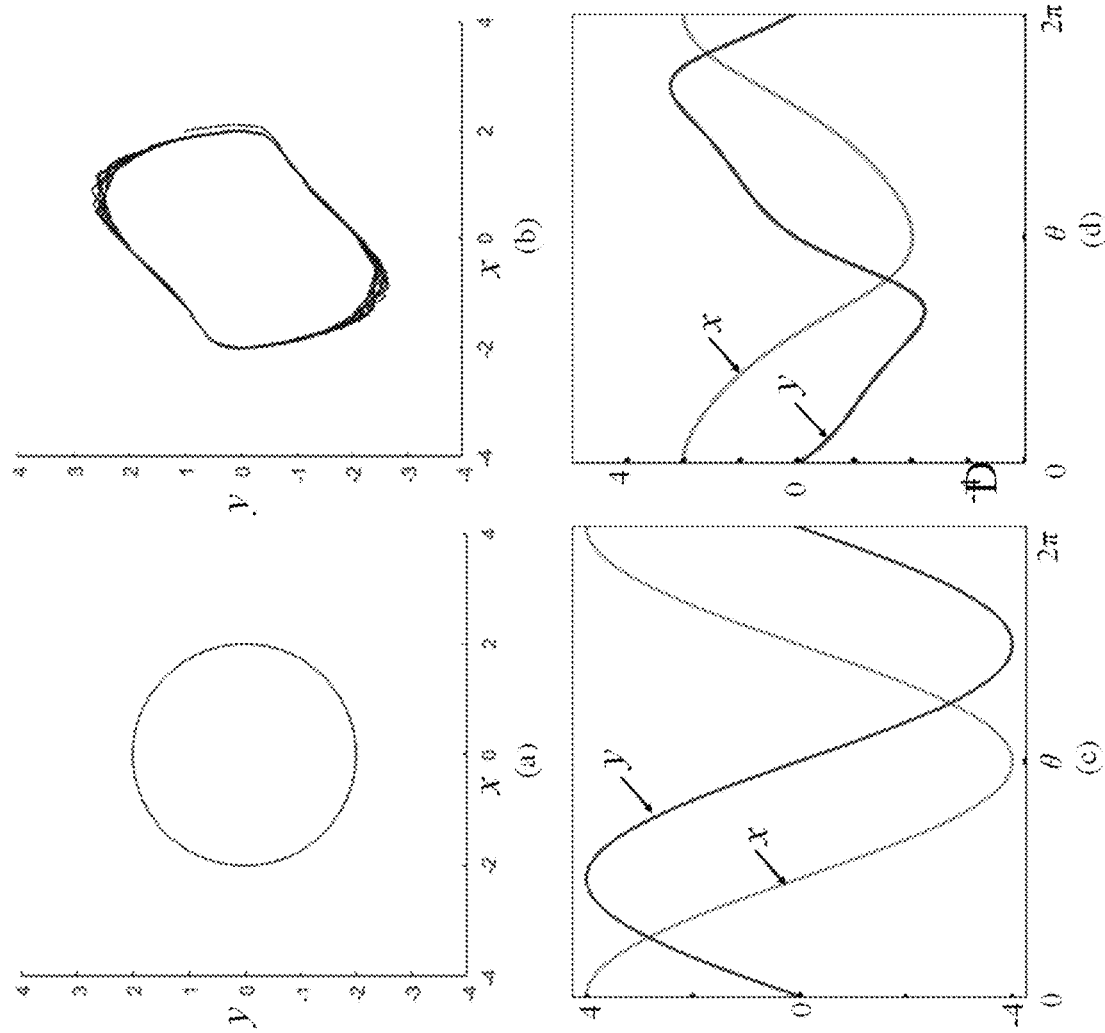
FIG. 9 shows a schematic diagram of a phase and of state solutions of a Van der Pol oscillator and of a Hopf oscillator according to an embodiment.

FIG. 9 shows a schematic diagram of a phase and of state solutions of a Van der Pol oscillator and of a Hopf oscillator according to an embodiment;

Due to the owning of global asymptotic synchronization features, the Van der Pol oscillator has been extensively analyzed and implemented for islanded converter control. However, its phase evolution is difficult to describe in contrast to Hopf oscillator.

Moreover, the comparisons between the Van der Pol oscillator and Hopf oscillation are shown in FIG. 9. FIGS. 9(a)-(d) show the phase portrait and state solutions of the oscillators, and it can be seen that PBO is structurally stable in a unique limit-circular, and the xy can be ideal orthogonal sinusoid. The Van der Pol oscillator generates a limit shapeless cycle, and distorted outputs xy with same perturbation. Otherwise its output approximates a limit-cycle when parameter stays in a small range. Consequently, Hopf performs better power quality to compare with Van der Pol.

This provides the following advantages: no active reactive/power should be calculated, and it only includes a voltage loop. Thus, the technology provides fast response. DC link of power electronics converters can be saved due to the fast response provided.

The Hopf-oscillator based controller is independent from the loads. It means that no matter how the loads changes, the system operation is stable.

At the same time, the method can adjust active/reactive power ratting in real time, being suitable to be controlled by a superior control level coming from a local controller or an energy management system.

The aforementioned features cannot be achieved by the existing methods at the same time.

For the sake of completeness, in the following, first, the derivation of the voltage and frequency regulation characteristics of the Hopf-oscillator-controlled inverters will be described. The derivation is based on an averaging analysis of the Hopf oscillator dynamics.

The dynamics of one Hopf oscillator under perturbation can be described by equations (1) and (2). By differentiating $V_\alpha = V \sin(\theta)$, $V_\beta = V \cos(\theta)$ with respect to time, the following equations are obtained:

$$\begin{cases} \dot{V}_\alpha = \cos(\theta)\dot{V} - V\sin(\theta)\dot{\theta} \\ \dot{V}_\beta = \sin(\theta)\dot{V} + V\cos(\theta)\dot{\theta} \end{cases} \quad (5)$$

Substituting equation (5) in equation (1), the phase dynamics equations of Hopf oscillator are obtained as follows:

$$\begin{cases} \dot{V} = (r^2 - V^2)V + k(i_\beta \sin(\theta) + i_\alpha \cos(\theta)) \\ \dot{\theta} = \omega + \dfrac{k}{V}(i_\alpha \sin(\theta) - i_\beta \cos(\theta)) \end{cases} \quad (6)$$

Subsequently, if T is a period of a periodic signal V(t), then the average value $\overline{V}$ is given by definition by:

$$\overline{V} = \frac{1}{T} \int_0^T V(t)dt \quad (7)$$

In order to simplify the averaged model, the dynamics of the inverter terminal voltage is defined as:

$$\frac{d\gamma}{dt} = \omega + \frac{d\theta}{dt} = \omega^* + \frac{d\theta^*}{dt} \quad (8)$$

where $\omega$ and $\omega^*$ are the nominal frequency of inverter output, and the steady state frequency of inverter output, respectively. The angles $\theta$ and $\theta^*$ donate the phase offset with respect to $\omega$ and $\omega^*$ respectively. Therefore, in the averaged model, the single Hopf oscillator dynamical system under $2\pi$-periodic function in time are presented as follows:

According to Newton-Leibniz formula, the first item of (9) equation can be derived as:

$$\frac{\omega^*}{2\pi} \int_0^{\frac{2\pi}{\omega^*}} (r^2 - V^2)Vdt = r^2\overline{V} - \overline{V}^3 \quad (10)$$

Considering the perturbation $i_{\alpha\beta}$, which is related to the instantaneous active and reactive power P, Q, the definition and average equations during a period of active and reactive power can be expressed as:

$$P = V\cos(\omega t)i_\alpha + V\sin(ft)i_\beta$$

$$Q = V\sin(\omega t)i_\alpha - V\cos(\omega t)i_\beta \quad (11)$$

In $2\pi$-periodic, the average and reactive power (11) can be obtained as:

$$\overline{P} = \frac{\omega^*}{2\pi} \int_0^{2\pi/\omega^*} (V\cos(\omega t)i_\alpha + V\sin(\omega t)i_\beta)dt \quad (12)$$

$$\overline{Q} = \frac{\omega^*}{2\pi} \int_0^{2\pi/\omega^*} (V\sin(\omega t)i_\alpha + V\cos(\omega t)i_\beta)dt$$

Substituting (10), (11) and (12) into (9), the nonlinear equations can be rewritten as:

$$\begin{bmatrix} \dot{\overline{V}} \\ \dot{\overline{\gamma}} \end{bmatrix} + \begin{bmatrix} r^2\overline{V} - \overline{V}^3 \\ \omega \end{bmatrix} + \frac{\omega}{2\pi}\int_0^{\frac{2\pi}{\omega^*}} \begin{bmatrix} -\dfrac{P}{V} \\ -\dfrac{Q}{V^2} \end{bmatrix} dt \quad (13)$$

Therefore, the dynamical equation of amplitude and phase of one oscillator are expressed as:

$$\begin{cases} \dot{\overline{V}} = r^2\overline{V} - \overline{V}^3 - \dfrac{k}{\overline{V}}\overline{P} \\ \dot{\gamma} = \omega^* - \omega + \dfrac{k}{\overline{V}^2}\overline{Q} \end{cases} \quad (14)$$

Remarkably, with Hopf oscillator control, the voltage-amplitude and phase dynamics are directly linked to the average active and reactive power outputs of the inverter 101. Consequently, these averaged dynamics can be leveraged for synthesizing Hopf oscillators so that the inverter satisfies voltage and frequency regulation specifications in the steady state.

Figure 10:
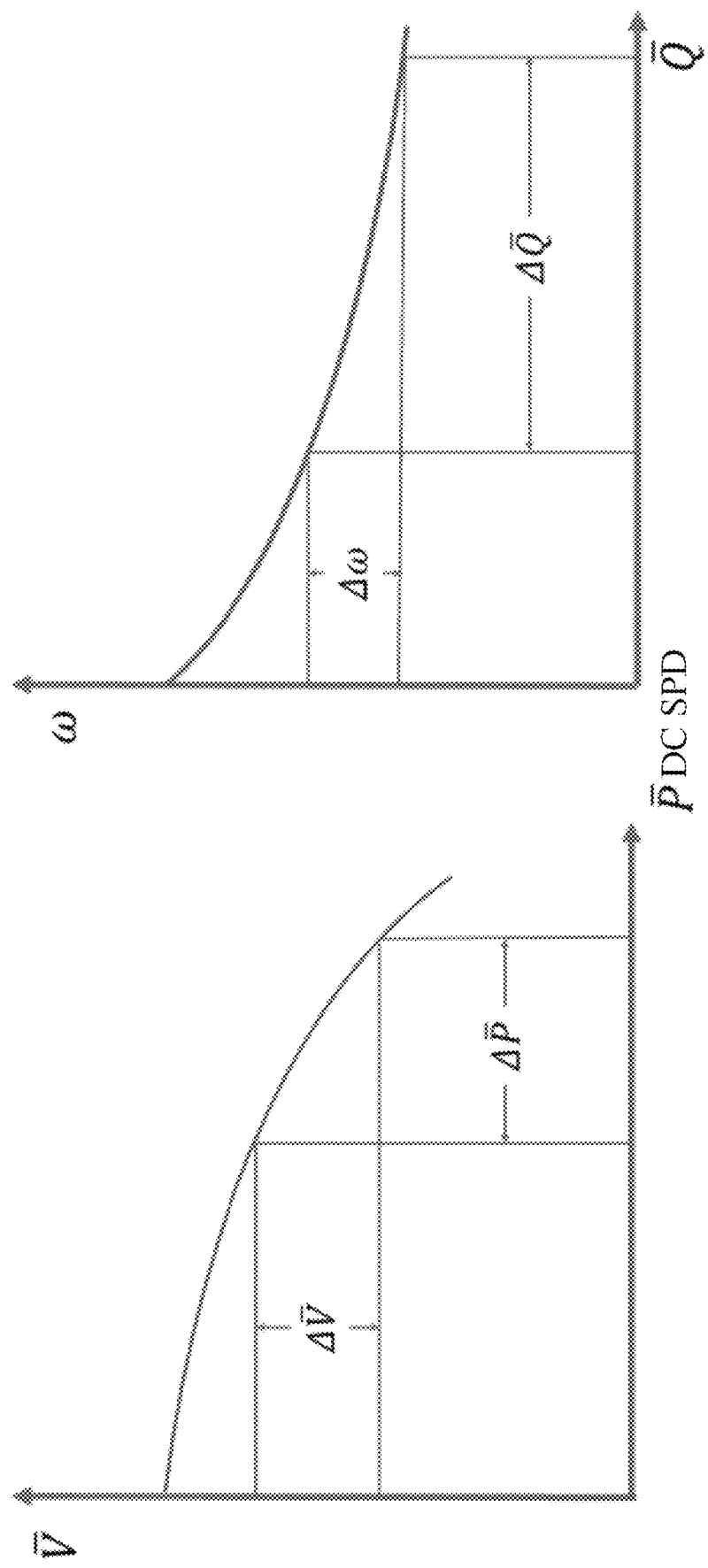
FIG. 10 shows a voltage amplitude and a frequency of a controller and of an inverter of a device according to an embodiment.

Therefore, the regulation characteristic can be analysed in deep based on (14). The relationship of voltage amplitude and active power, frequency and reactive power is shown in FIG. 10.

$$\begin{cases} \dot{V} = \dfrac{\omega^*}{2\pi}\int_0^{\frac{2\pi}{\omega^*}} (r^2 - V^2)Vdt + \dfrac{\omega^*k}{2\pi}\int_0^{\frac{2\pi}{\omega^*}} (i_\beta\sin(\omega^*t + \theta^*) - i_\alpha\cos(\omega^*t + \theta^*))dt \\ \dot{\gamma} = \omega + \dfrac{\omega^*k}{2\pi V}\int_0^{\frac{2\pi}{\omega^*}} (i_\alpha\sin(\omega^*t + \theta^*) + i_\beta\cos(\omega^*t + \theta^*))dt \end{cases} \quad (9)$$

The equilibria of (13) is able to be solved based on the solutions of the nonlinear equation as follow:

$$r^2 \overline{V}_{eq} - \overline{V}_{eq}^3 - \frac{k}{\overline{V}_{eq}} \overline{P}_{eq} = 0 \quad (15)$$

Where $\overline{V}_{eq}$ and $\overline{P}_{eq}$ refer to the equilibrium steady-state RMS-voltage amplitude and average active power output, respectively. Therefore, the positive roots of (15) are given by:

$$\overline{V}_{eq-pos} = \sqrt{\frac{1}{2}r^2 \pm \frac{1}{2}\sqrt{r^4 - 8k\overline{P}_{eq}}} \quad (16)$$

Therefore, the two roots are real values, if the equilibrium real power output satisfies:

$$0 < \overline{P}_{eq} < \overline{P}_{max} = \frac{r^4}{8k} \quad (17)$$

Consequently, the critical value for active power $\overline{P}_{max}$ is set. Therefore, the maximum of output voltage can be defined based on $\overline{P}_{max}$ which is related to the voltage reference and the parameter k.

Consider the phasor-angle dynamics in (13). The equilibrium of frequency can be derived as:

$$\omega_{eq} = \omega^* + \frac{k}{\overline{V}_{eq}^2} \overline{Q} \quad (18)$$

Therefore, the equilibrium frequency can be designed based on voltage amplitude and reactive power.

In the following, an example of an inverter connection with resistive loads will be given.

Figure 11:
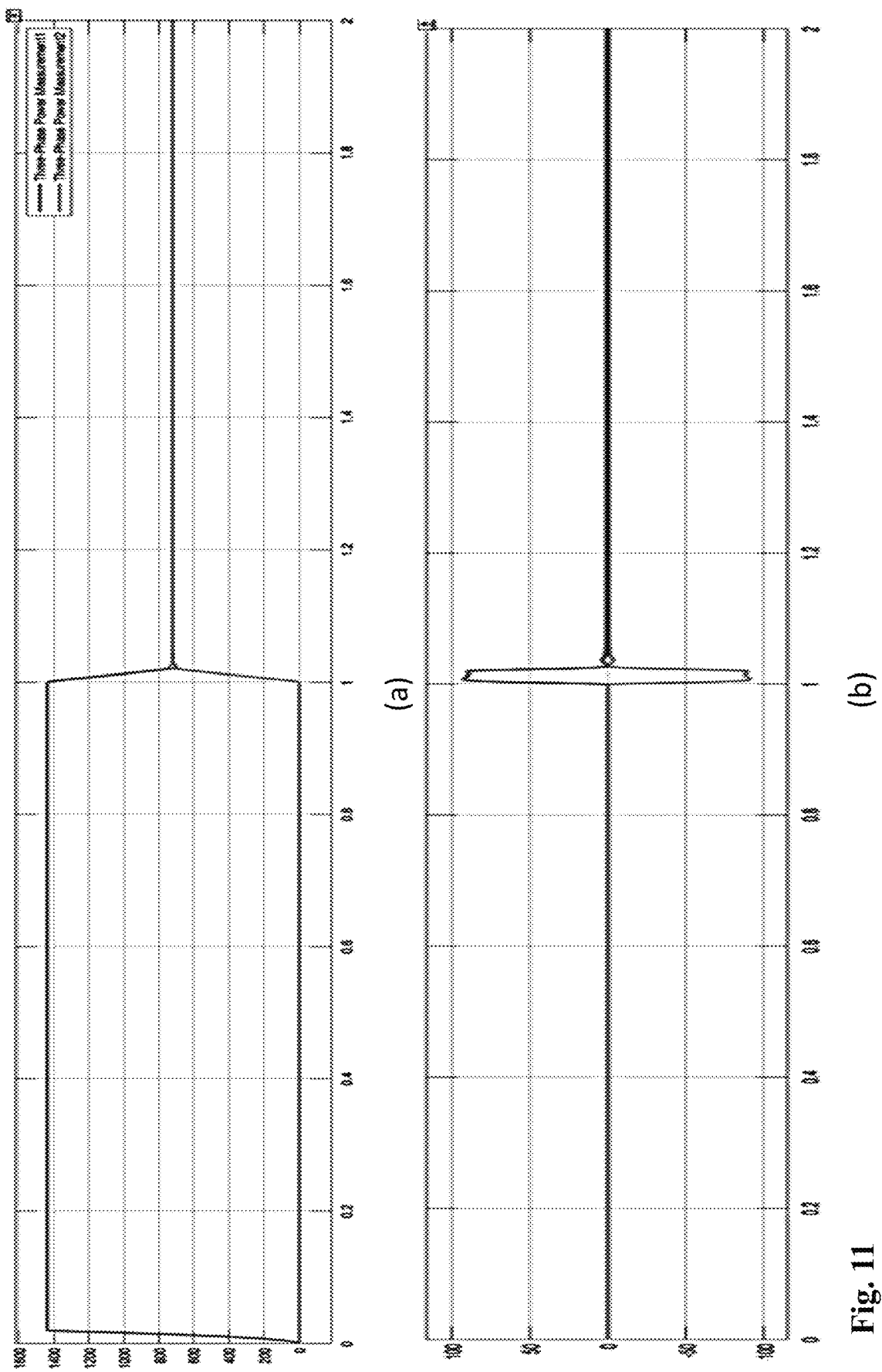
FIG. 11 shows an active power (a) and a reactive power (b) sharing waveform under inverter connection according to an embodiment.
Figure 12:
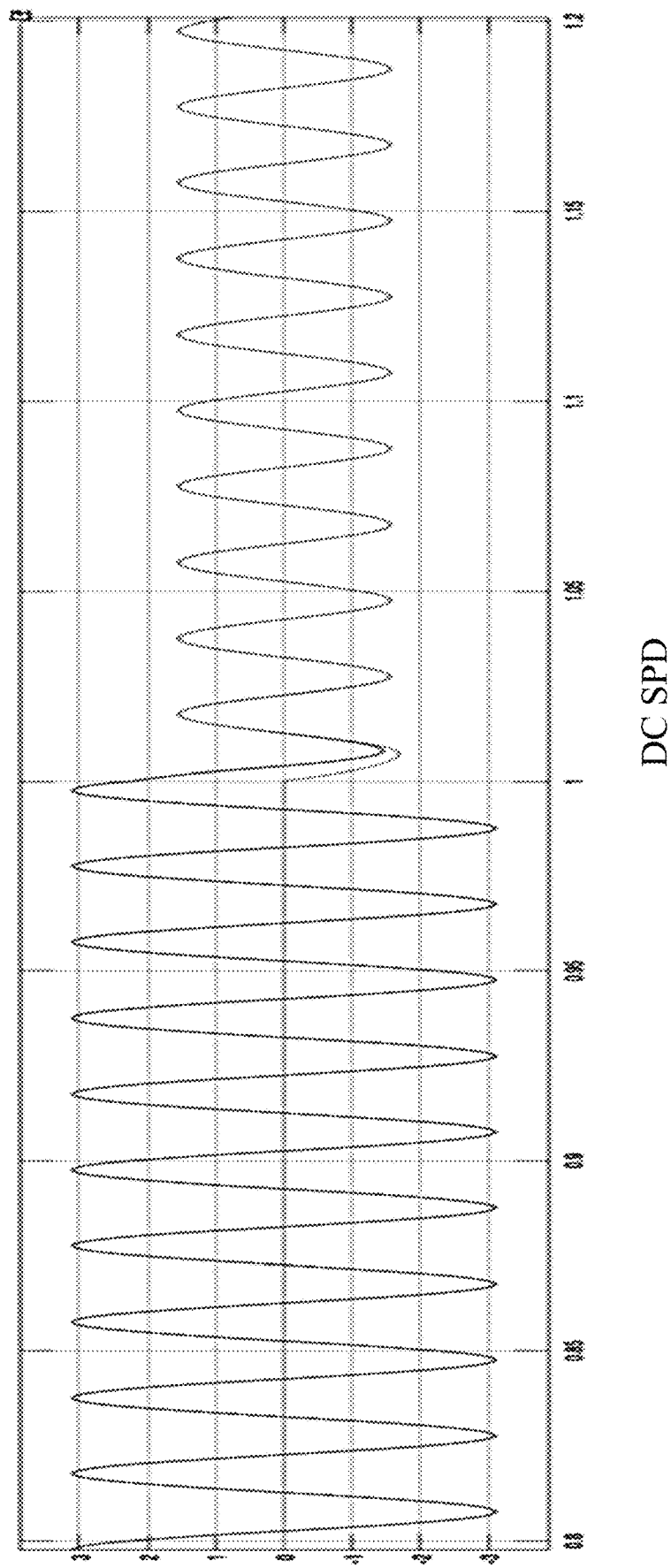
FIG. 12 shows two inverters current sharing waveform under inverter connection according to an embodiment.
Figure 13:
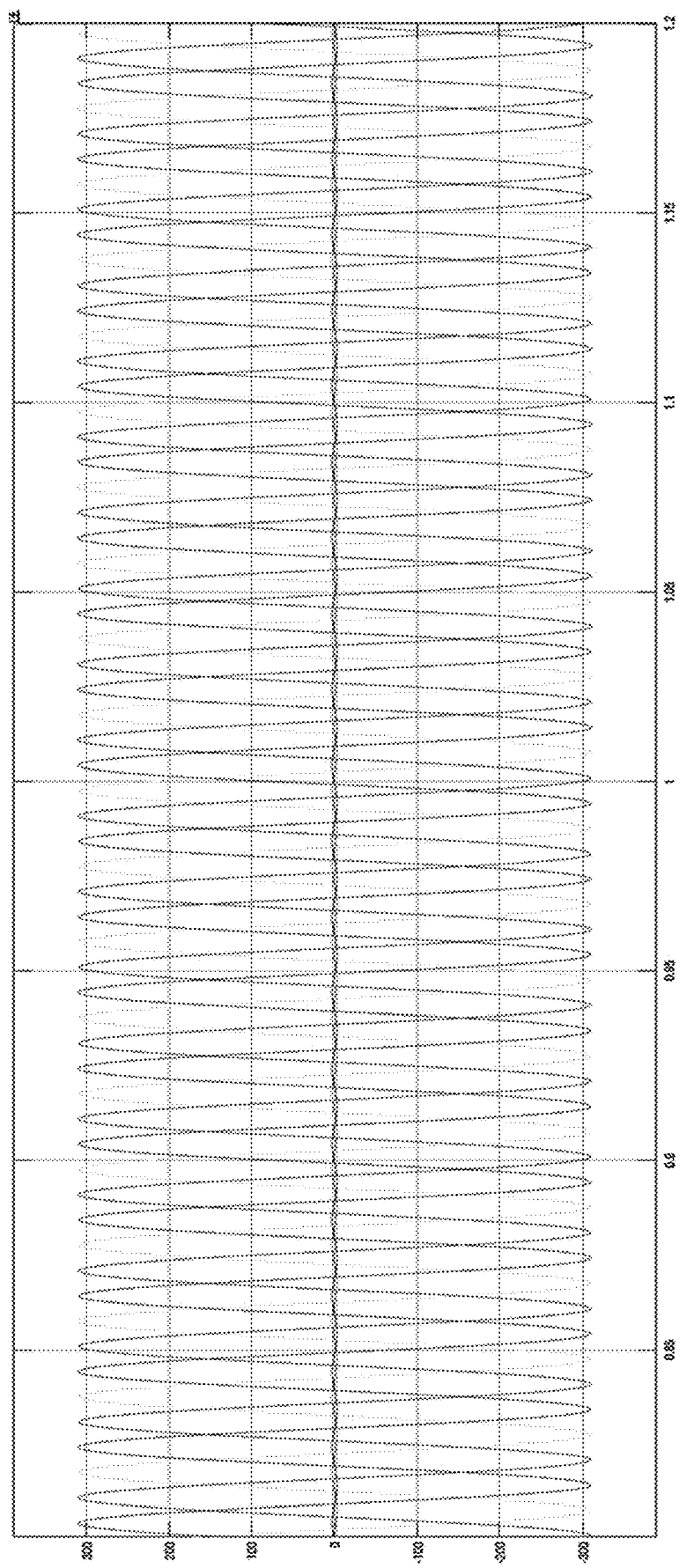
FIG. 13 shows a current and voltage of loads waveform under inverter connection according to an embodiment.

In this example, the voltage reference is 311 V, the filter is 0.1 ohm+3 mF, the load is 100 ohm. The control parameter k=100. FIGS. 11-13 illustrate the active power and reactive power, a phase of currents, voltage and current of loads when the second inverter 102 connects to the system at 1 s.

In the following, an example of an inverter removal with resistive-inductive loads will be given.

Figure 14:
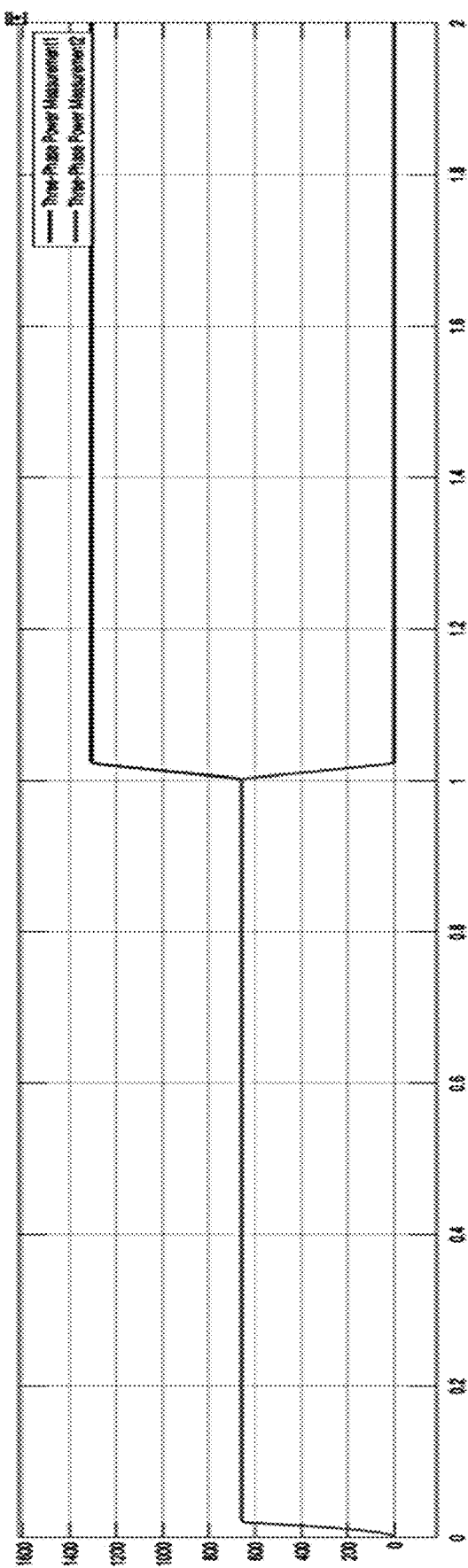
FIG. 14 shows an active power (a) and a reactive power (b) sharing waveform under inverter removal according to an embodiment.
Figure 14:
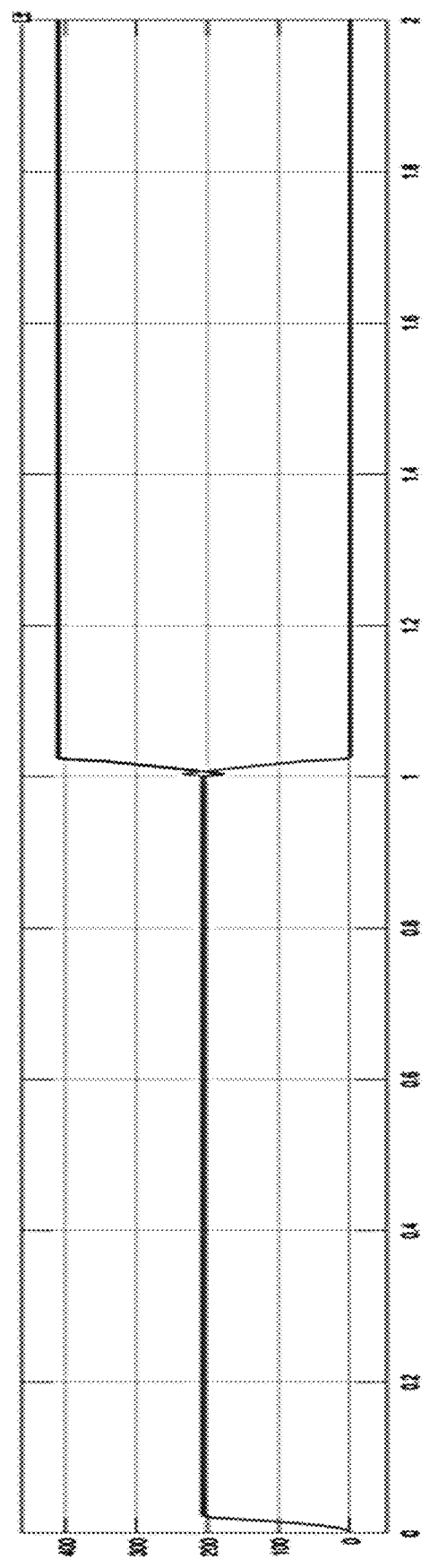
Figure 15:
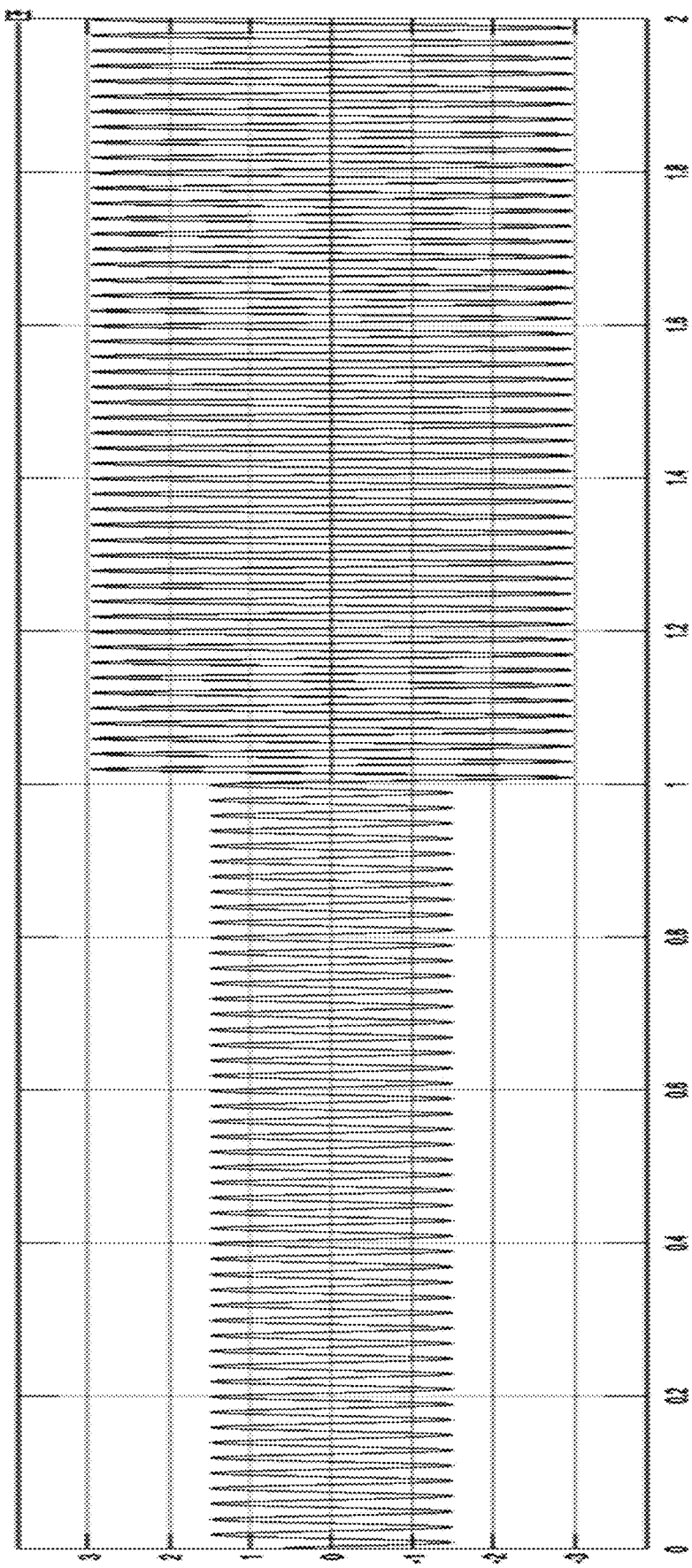
FIG. 15 shows two inverters current sharing waveform under inverter removal according to an embodiment.
Figure 16:
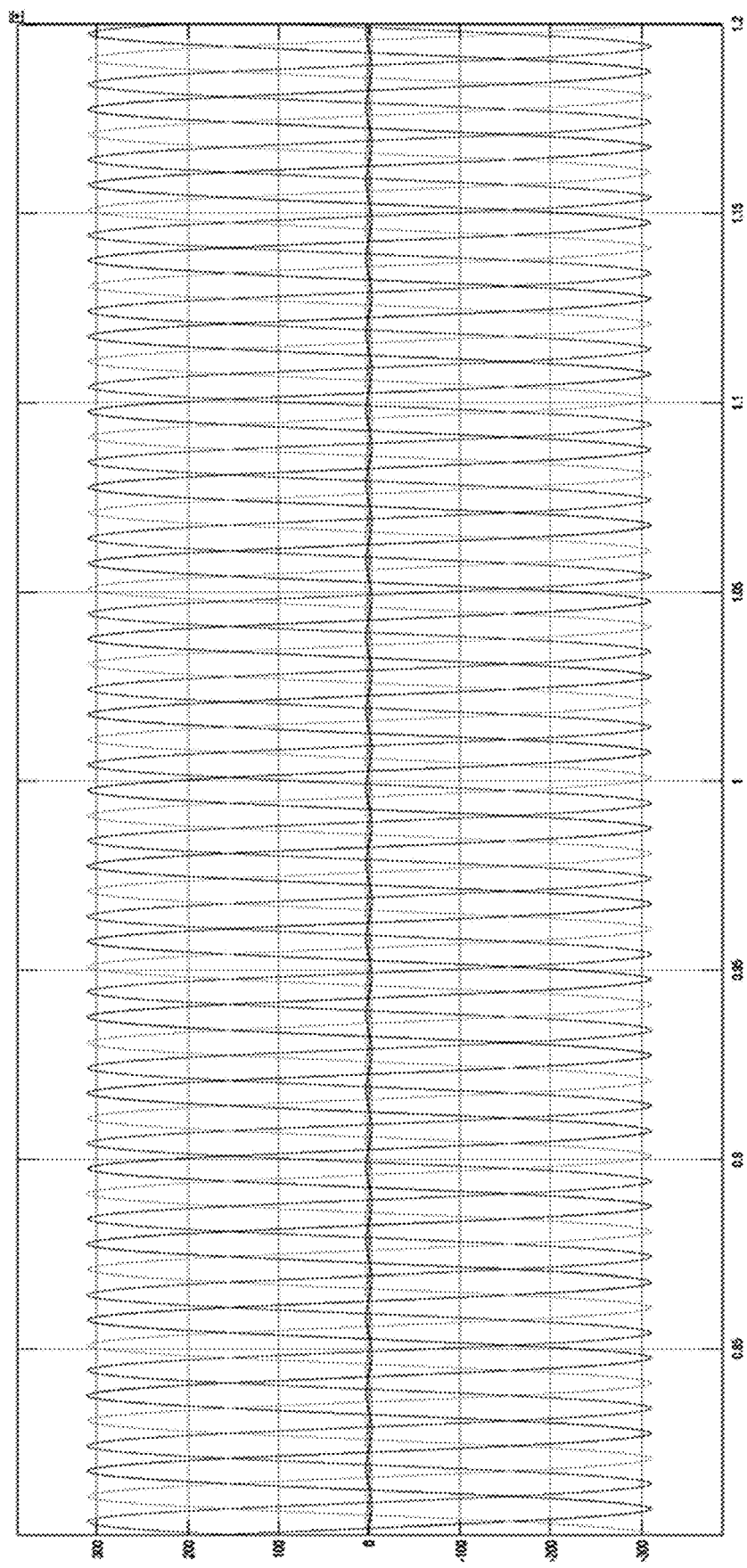
FIG. 16 shows a current and voltage of loads waveform under inverter removal according to an embodiment.

In this example, the resistive and inductive loads (100 ohm+0.1 H) are connected to the system. The second inverter 102 is removed at 1 s. The simulation results are shown in FIGS. 14-16.

In some embodiments, in FIG. 14, the active power (upper) and reactive power (below) sharing waveform under inverter removal are shown. In FIG. 15, the two inverters current sharing waveforms (A phase) under inverter removal are shown, while in FIG. 16, the current and voltage of loads waveform under inverter removal are shown.

In the following, a case of support of nonlinear loads is given.

In this case, the nonlinear loads are connected at 1 s. The nonlinear loads are a rectifier with RC circuit (50 ohm+60 μF). The simulation results are shown in FIG. 17-19.

Figure 17:
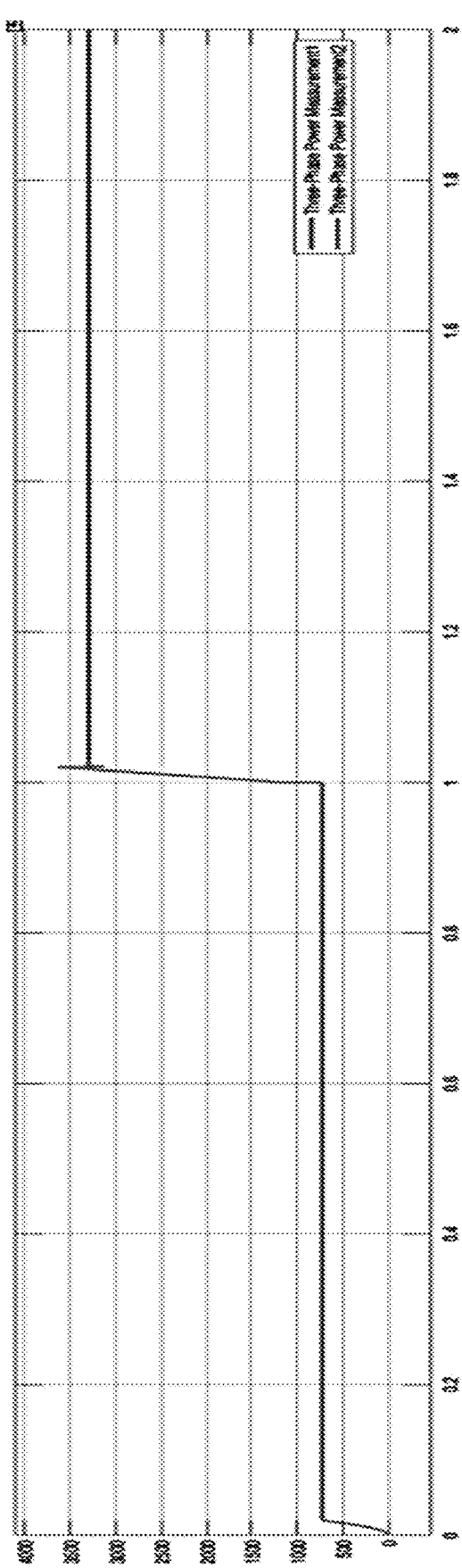
FIG. 17 shows an active power (a) and a reactive power (b) sharing waveform under non-linear load connections according to an embodiment.
Figure 17:
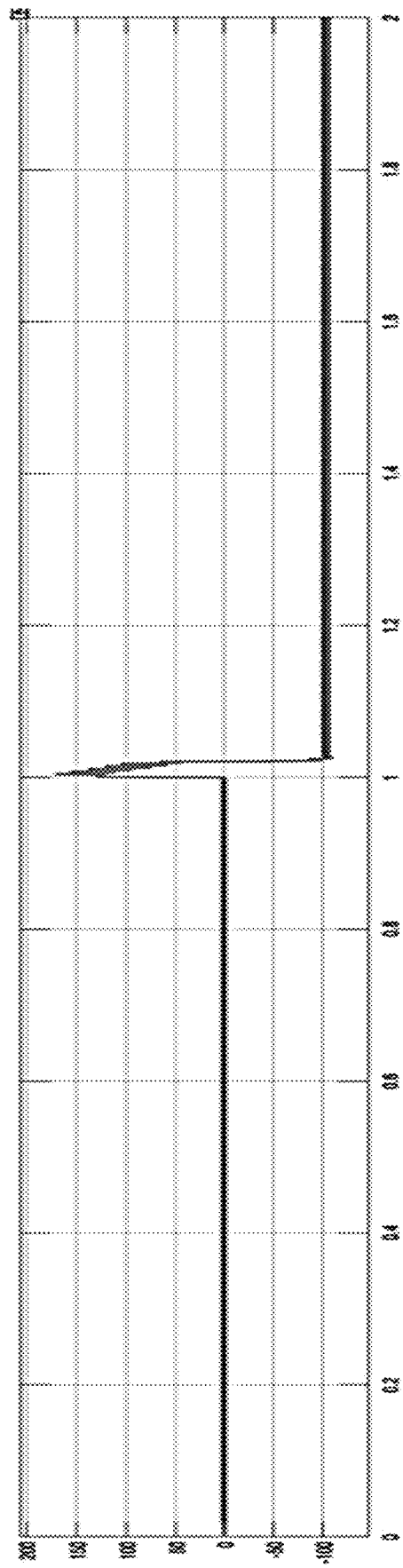
Figure 18:
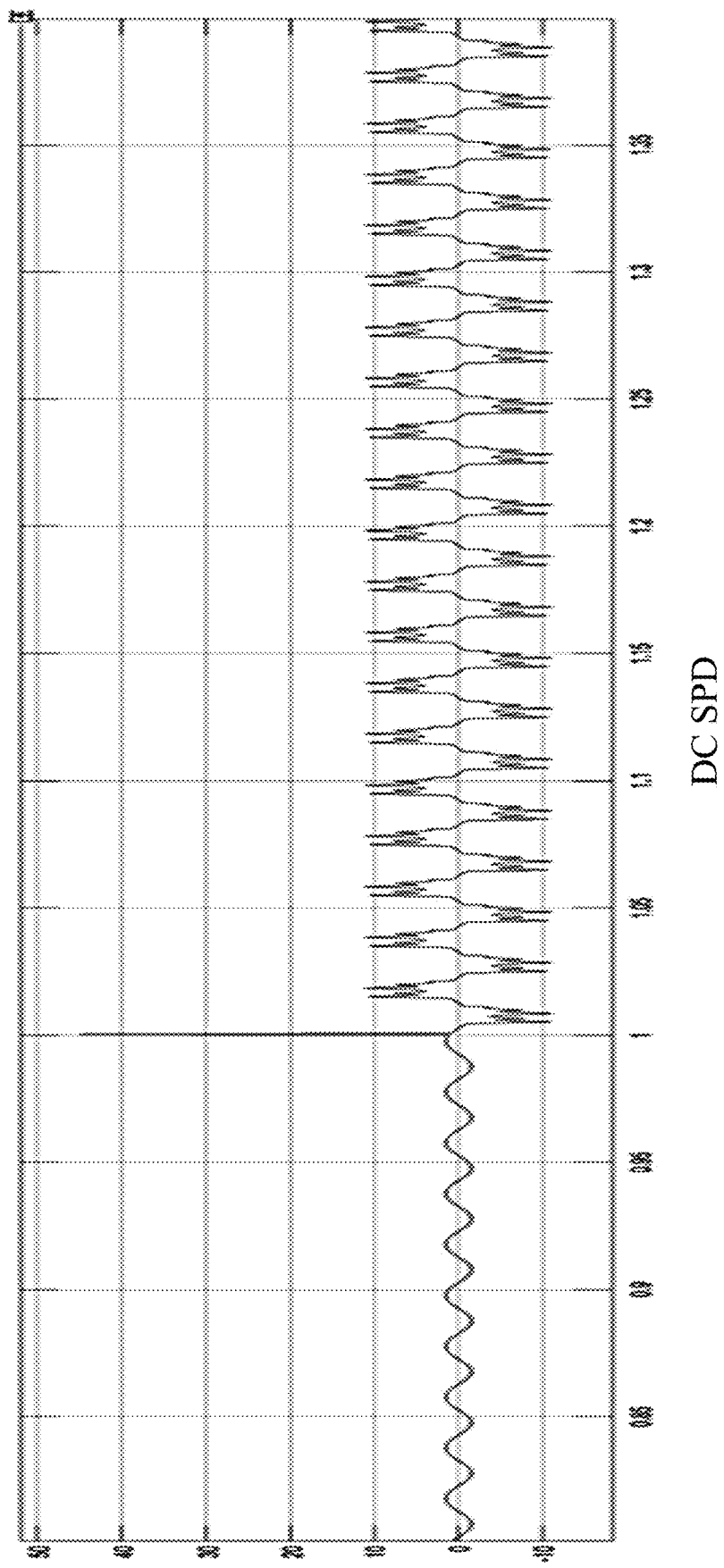
FIG. 18 shows two inverters current sharing waveform under non-linear load connections according to an embodiment.
Figure 19:
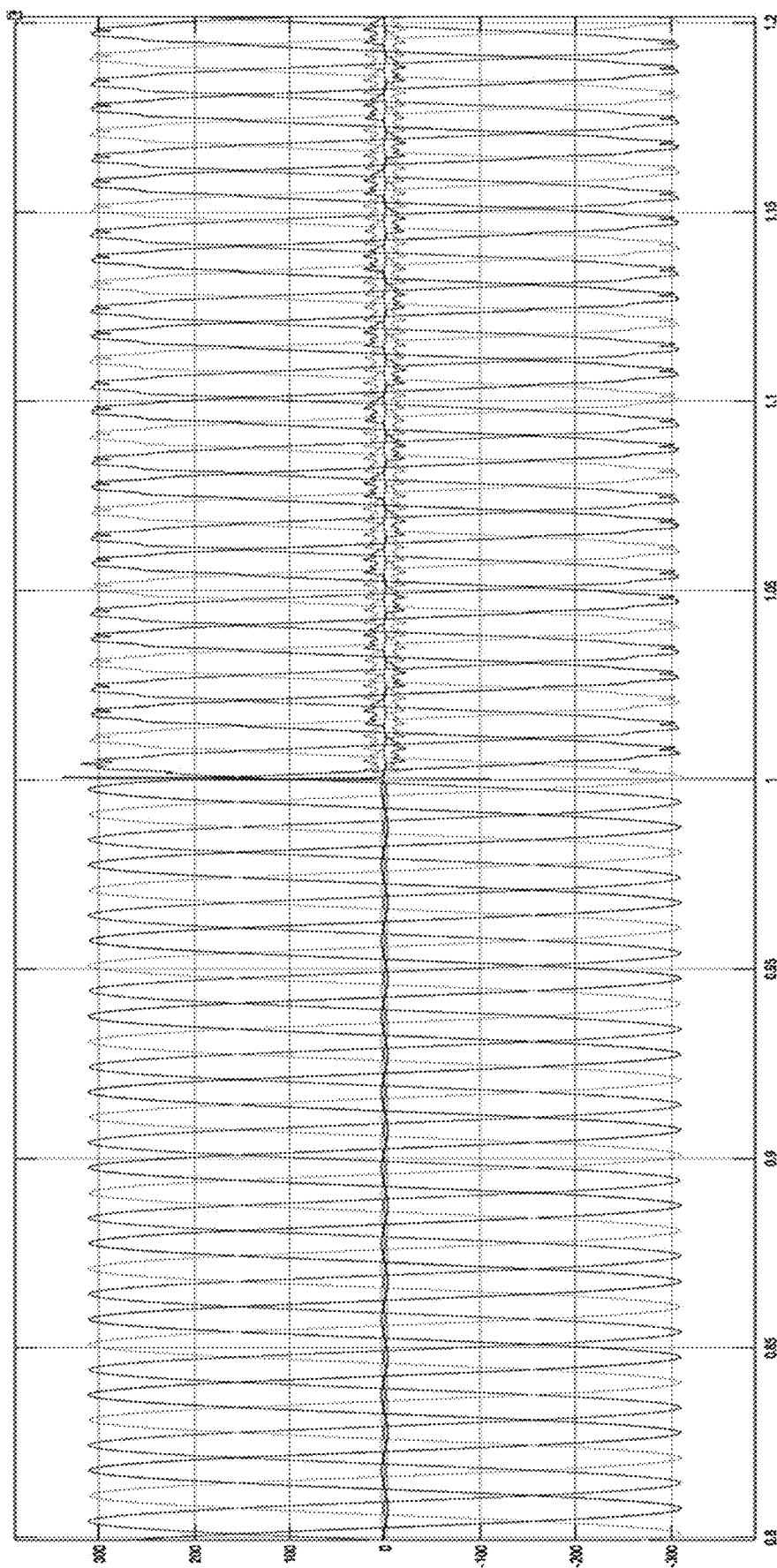
FIG. 19 shows current and voltage of loads waveform under nonlinear connection according to an embodiment.

In some embodiments, FIG. 17 shows the active power (upper) and reactive power (below) sharing waveform under nonlinear loads connection, FIG. 18 shows the two inverters current sharing waveform (A phase) under nonlinear loads connection, and FIG. 19 shows the current and voltage of loads waveform under nonlinear loads connection. Simulation results show that embodiments of the disclosure provide fast response, robustness, sharing precision and stable operation under islanded control mode.

Figure 20:
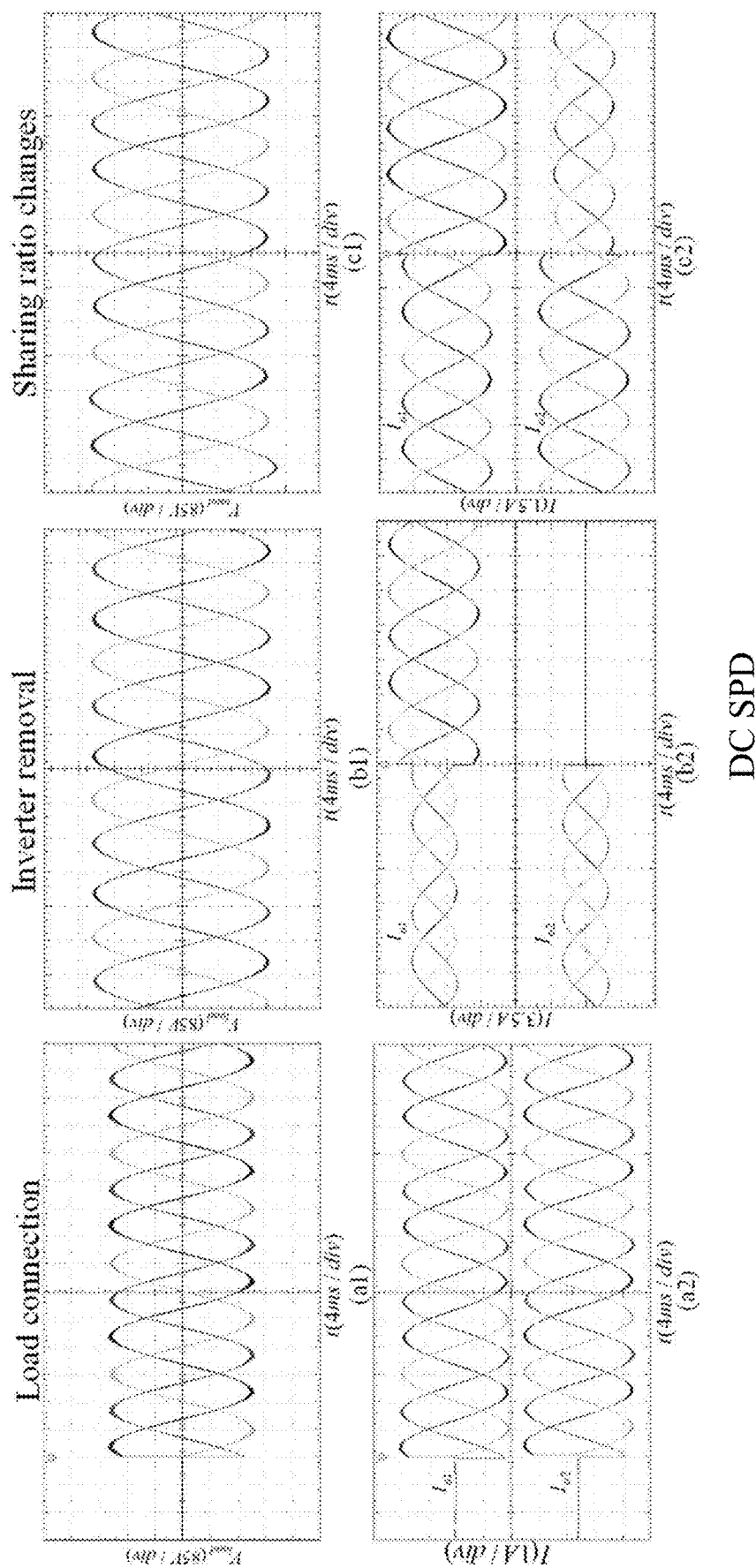
FIG. 20 shows experimental result of transient responses according to an embodiment.

FIG. 20 shows experimental results of transient responses according to an embodiment.

Experimental results showing the controller's performance under different scenarios are depicted as follows.

The performance of the proposed method was verified by the dSPACE 1006 real-time platform with 2.2 kW inverters. The DC voltage is 650 V and the voltage reference is 311 V. The IGBT's switching frequency is 10 kHz, and the L-filter inductance is 3 mH. The oscillator parameters are k=52.4, $\omega_0$=100π, and the initial state is (311 0). The resistive loads are 150 ohm.

FIG. 20 shows the transient responses of loads voltage and output current in different scenarios. FIG. 20. (a1) (a2) illustrates the current transit response for load connection in the ac common bus. The proposed controller can achieve stable operation with 1:1 currents sharing ratio. The transient responses for sudden second inverter removal are shown in FIG. 20 (b1) (b2). Note that the remaining first inverter 101 abruptly increases the current output when the second inverter 102 is removed, which ensures the load voltage continues to meet requirement. The waveforms of FIG. 20 (c1), (c2) depict the transient response to current ratio changes in resistive load from 1:1 to 2:1. It can be observed that the increase and decrease of output current are nearly instantaneous, and load voltage is also stable. Therefore, it can be concluded that the load voltage is stable based on oscillator controller, and the proposed method can achieve synchronization and current sharing fast.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A device, comprising:
   a first inverter, wherein the first inverter is configured to invert a direct current (DC) input voltage into an alternating current (AC) output voltage;
   a first controller, wherein the first controller is configured to provide a reference voltage for the first inverter based on an AC output current of the first inverter;
   a second inverter, wherein the second inverter is configured to invert a DC input voltage into an AC output voltage;
   a second controller, wherein the second controller is configured to provide a reference voltage for the second inverter based on an AC output current of the second inverter;
   wherein the first inverter and the first controller form a first nonlinear oscillator,
   wherein the second inverter and second controller form a second nonlinear oscillator, and wherein the first nonlinear oscillator is coupled to the second nonlinear oscillator, wherein at least one of the first inverter or the second inverter is a three-phase inverter comprising a plurality of half-bridges and a plurality of filters, wherein the plurality of filters comprises at least one of an L filter, an LCL filter, or LC filter, wherein the first inverter and the second inverter are not in mutual communication, wherein the first controller and the second controller are configured to generate the reference voltages according to:

$$\begin{cases} \dot{V}_\alpha = (r_\alpha^2 - (V_\alpha^2 + V_\beta^2))V_\alpha - (\omega_\alpha V_\beta - k_\alpha i_\alpha) \\ \dot{V}_\beta = (r_\beta^2 - (V_\alpha^2 + V_\beta^2))V_\beta + (\omega_\beta V_\alpha + k_\beta i_\beta) \end{cases},$$

wherein $i_\alpha$ is the AC output current of the first inverter after a Clarke transformation,
wherein $i_\beta$ is the AC output current of the second inverter, after a Clarke transformation, $V_\alpha$ is an output reference voltage of the first controller, $V_\beta$ is an output reference voltage of the second controller, $r_\alpha$ is a steady state amplitude of oscillation of the first nonlinear oscillator, $r_\beta$ is a steady state amplitude of oscillation of the second nonlinear oscillator, $\omega_\alpha$ is an oscillator frequency of the first nonlinear oscillator, $\omega_\beta$ is an oscillator frequency of the second nonlinear oscillator, $k_\alpha$ is a current gain of the first inverter, and $k_\beta$ is a current gain of the second inverter.

2. The device of claim 1, wherein the device is further configured to perform one or more of the following operations to calculate a value of k:
run a model for k without load;
calculate a voltage Vpk;
if Vpk<Vmin, wherein Vmin corresponds to a voltage of the first inverter without rated load, then decrease k and run a model for k without load;
if Vpk>Vmax, wherein Vmax corresponds to a voltage of the first inverter with full-rated load, then increase k and run a model for k without load; or
if Vmin<Vpk<Vmax, then stop.

3. A microgrid, comprising:
a first inverter, wherein the first inverter is configured to invert a direct current (DC) input voltage into an alternating current (AC) output voltage;
a first controller, wherein the first controller is configured to provide a reference voltage for the first inverter based on an AC output current of the first inverter;
a second inverter, wherein the second inverter is configured to invert a DC input voltage into an AC output voltage;
a second controller, wherein the second controller is configured to provide a reference voltage for the second inverter based on an AC output current of the second inverter;
wherein the first inverter and the first controller form a first nonlinear oscillator,
wherein the second inverter and second controller form a second nonlinear oscillator, and wherein the first nonlinear oscillator is coupled to the second nonlinear oscillator, wherein at least one of the first inverter or the second inverter is a three-phase inverter comprising a plurality of half-bridges and a plurality of filters, wherein the plurality of filters comprises at least one of an L filter, an LCL filter, or an LC filter, wherein the first inverter and the second inverter are not in mutual communication, wherein the first controller and the second controller are configured to generate the reference voltages according to:

$$\begin{cases} \dot{V}_\alpha = (r_\alpha^2 - (V_\alpha^2 + V_\beta^2))V_\alpha - (\omega_\alpha V_\beta - k_\alpha i_\alpha) \\ \dot{V}_\beta = (r_\beta^2 - (V_\alpha^2 + V_\beta^2))V_\beta + (\omega_\beta V_\alpha + k_\beta i_\beta) \end{cases},$$

wherein $i_\alpha$ is the AC output current of the first inverter after a Clarke transformation, wherein $i_\beta$ is the AC output current of the second inverter, after a Clarke transformation, $V_\alpha$ is an output reference voltage of the first controller, $V_\beta$ is an output reference voltage of the second controller, $r_\alpha$ is a steady state amplitude of oscillation of the first nonlinear oscillator, $r_\beta$ is a steady state amplitude of oscillation of the second nonlinear oscillator, $\omega_\alpha$ is an oscillator frequency of the first nonlinear oscillator, $\omega_\beta$ is an oscillator frequency of the second nonlinear oscillator, $k_\alpha$ is a current gain of the first inverter, and $k_\beta$ is a current gain of the second inverter.

4. The microgrid of claim 3, further configured to perform one or more of the following operations to calculate a value of k:
run a model for k without load;
calculate a voltage Vpk;
if Vpk<Vmin, wherein Vmin corresponds to a voltage of the first inverter without rated load, then decrease k and run a model for k without load;
if Vpk>Vmax, wherein Vmax corresponds to a voltage of the first inverter with full-rated load, then increase k and run a model for k without load; or
if Vmin<Vpk<Vmax, then stop.

* * * * *